United States Patent [19]

Rohner et al.

[11] 4,208,810

[45] Jun. 24, 1980

[54] CLIPPING POLYGON FACES THROUGH A POLYHEDRON OF VISION

[75] Inventors: Michel A. Rohner, San Jose; Judit K. Florence, Menlo Park, both of Calif.

[73] Assignee: The Singer Company, Binghamton, N.Y.

[21] Appl. No.: 940,818

[22] Filed: Sep. 11, 1978

[51] Int. Cl.² ........................... G09B 9/08; H04N 7/18
[52] U.S. Cl. .................................. 35/10.24; 35/12 N; 358/103; 364/521
[58] Field of Search ............... 364/515, 521, 518, 522, 364/723; 358/103, 104; 35/10.23, 10.24

[56] References Cited

U.S. PATENT DOCUMENTS

| | | | |
|---|---|---|---|
| 3,639,736 | 2/1972 | Sutherland | 364/723 |
| 3,816,726 | 6/1974 | Sutherland et al. | 364/518 |
| 3,999,308 | 12/1976 | Peters | 35/10.2 |
| 4,054,917 | 10/1977 | Race | 35/10.2 |
| 4,152,766 | 5/1979 | Osofsky et al. | 364/515 |

Primary Examiner—Felix D. Gruber
Attorney, Agent, or Firm—Paul Hentzel; J. Dennis Moore; Jeff Rothenberg

[57] ABSTRACT

A flight simulator combines flight data and polygon face terrain data to provide a CRT display at each window of the simulated aircraft. The data base specifies the relative position of each vertex of each polygon face therein. Only those terrain faces currently appearing within the pyramid of vision defined by the pilots eye and the edges of the pilots window need be displayed at any given time. As the orientation of the pyramid of vision changes in response to flight data, the displayed faces are correspondingly displaced, eventually moving out of the pyramid of vision. Faces which are currently not visible (outside the pyramid of vision) are clipped from the data flow. In addition, faces which are only partially outside of pyramid of vision are reconstructed to eliminate the outside portion. Window coordinates are generated defining the distance between each vertex and each of the boundary planes forming the pyramid of vision. The sign bit of each window coordinate indicates whether the vertex is on the pyramid of vision side of the associated boundary panel (positive), or on the other side thereof (negative). The set of sign bits accompanying each vertex constitute the "outcode" of that vertex. The outcodes (O.C.) are systematically processed and examined to determine which faces are completely inside the pyramid of vision (Case A—all signs positive), which faces are completely outside (Case C—All signs negative) and which faces must be reconstructed (Case B—both positive and negative signs).

18 Claims, 33 Drawing Figures

Fig_3
TRANSLATION STAGE 60

Fig_4
ROTATION STAGE 62

PROJECTION STAGE 64

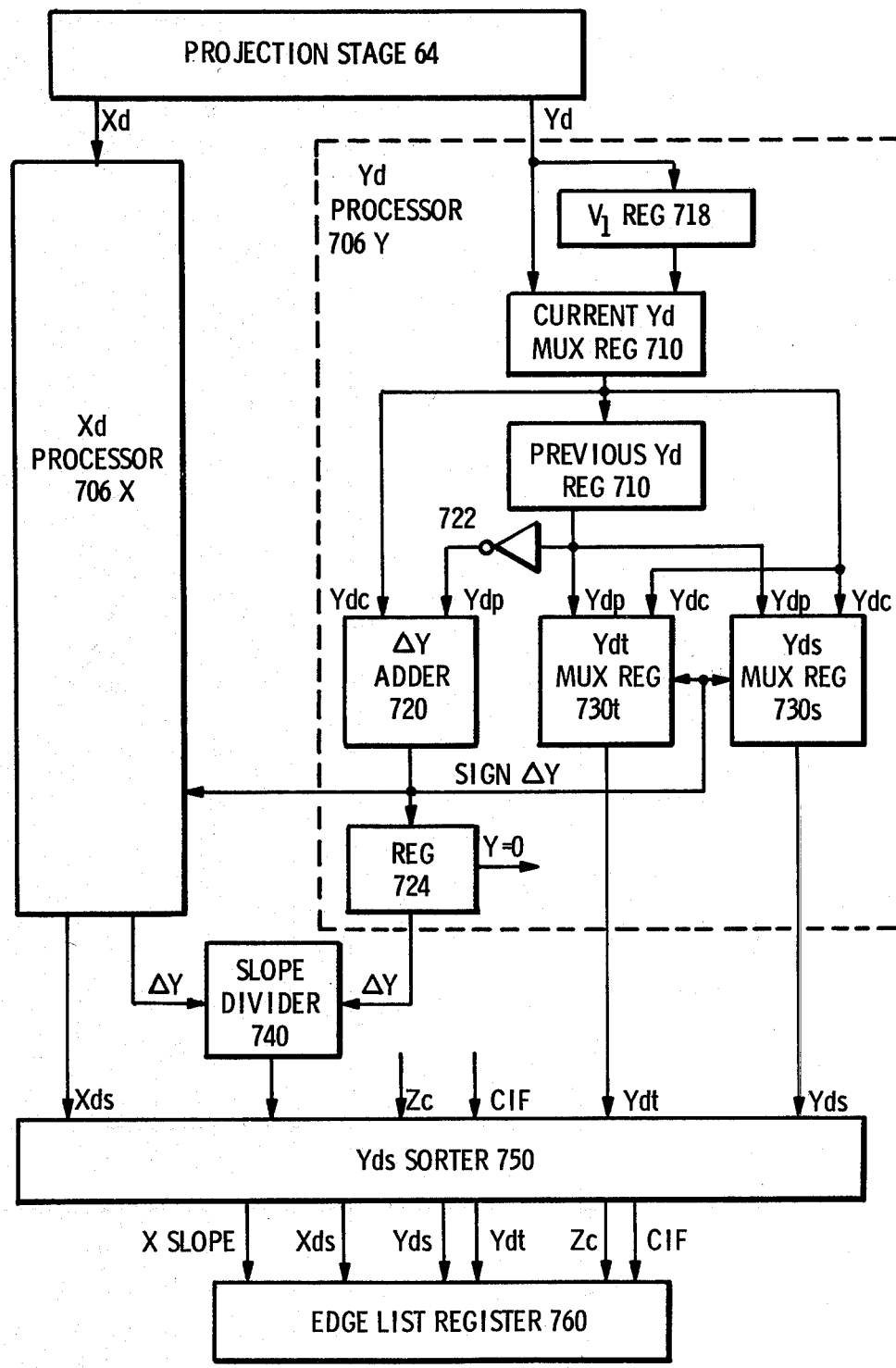
Fig_7
EDGE STAGE 65

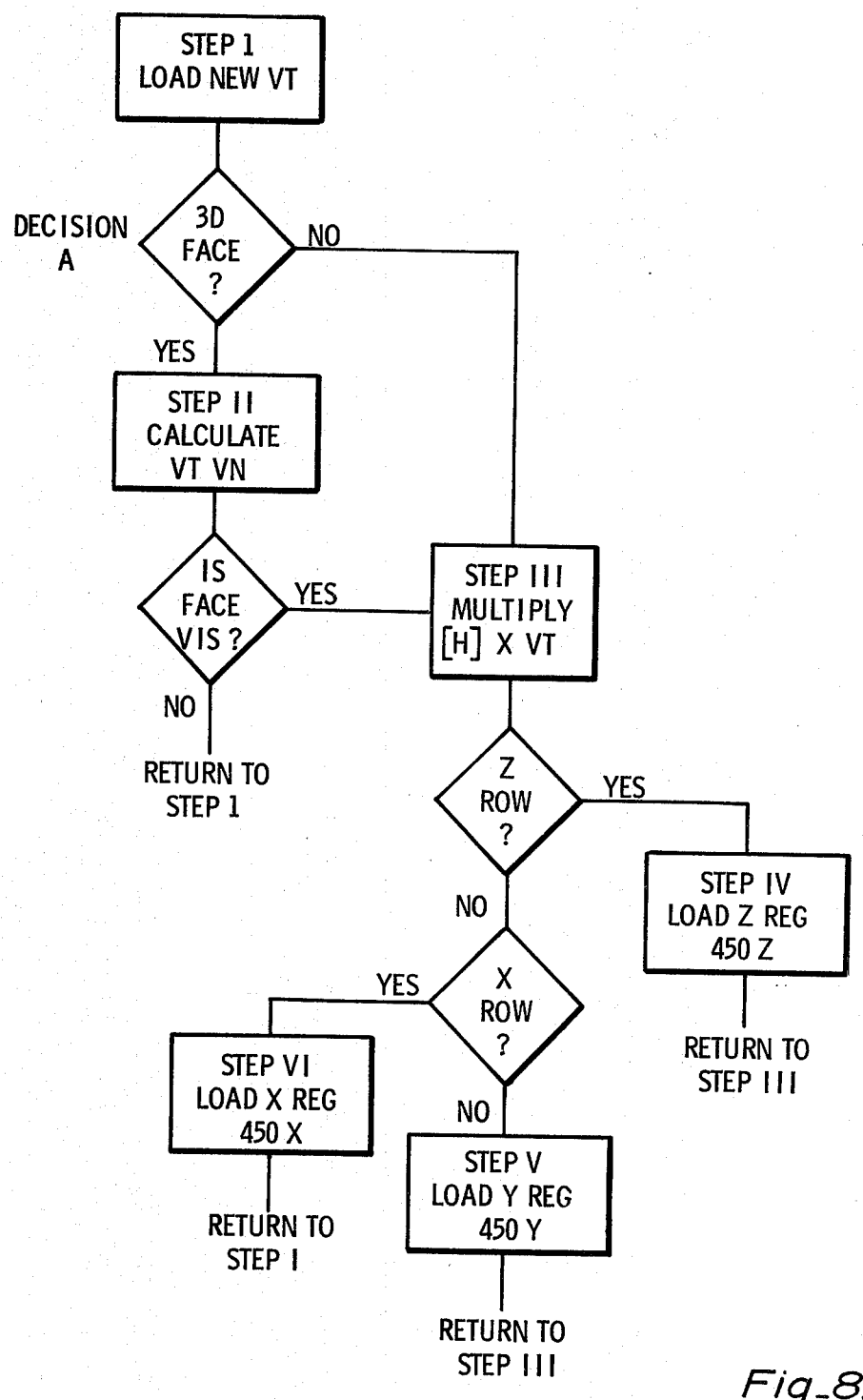
Fig_8A
ROTATION CONTROL

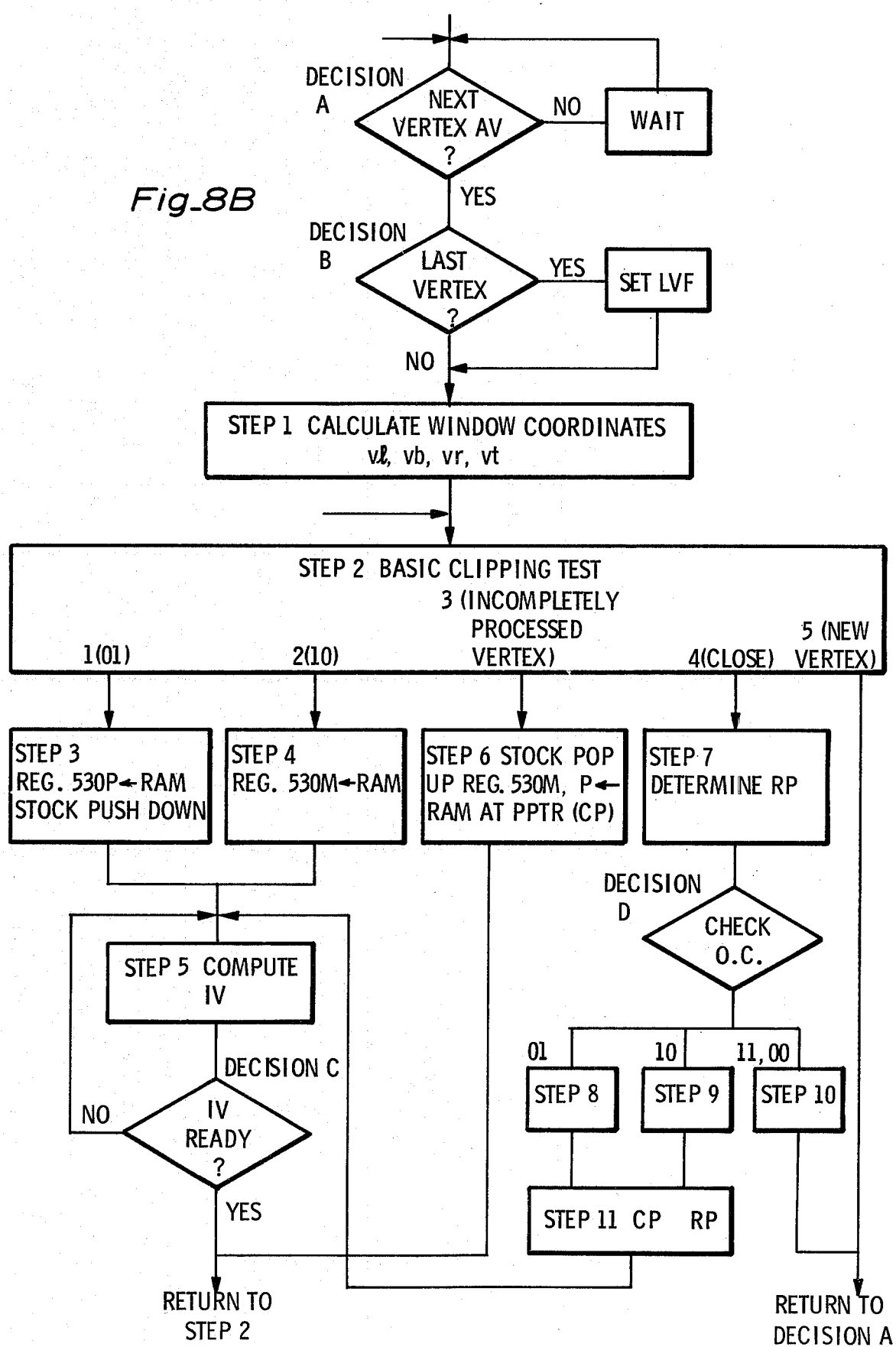
Fig_8B

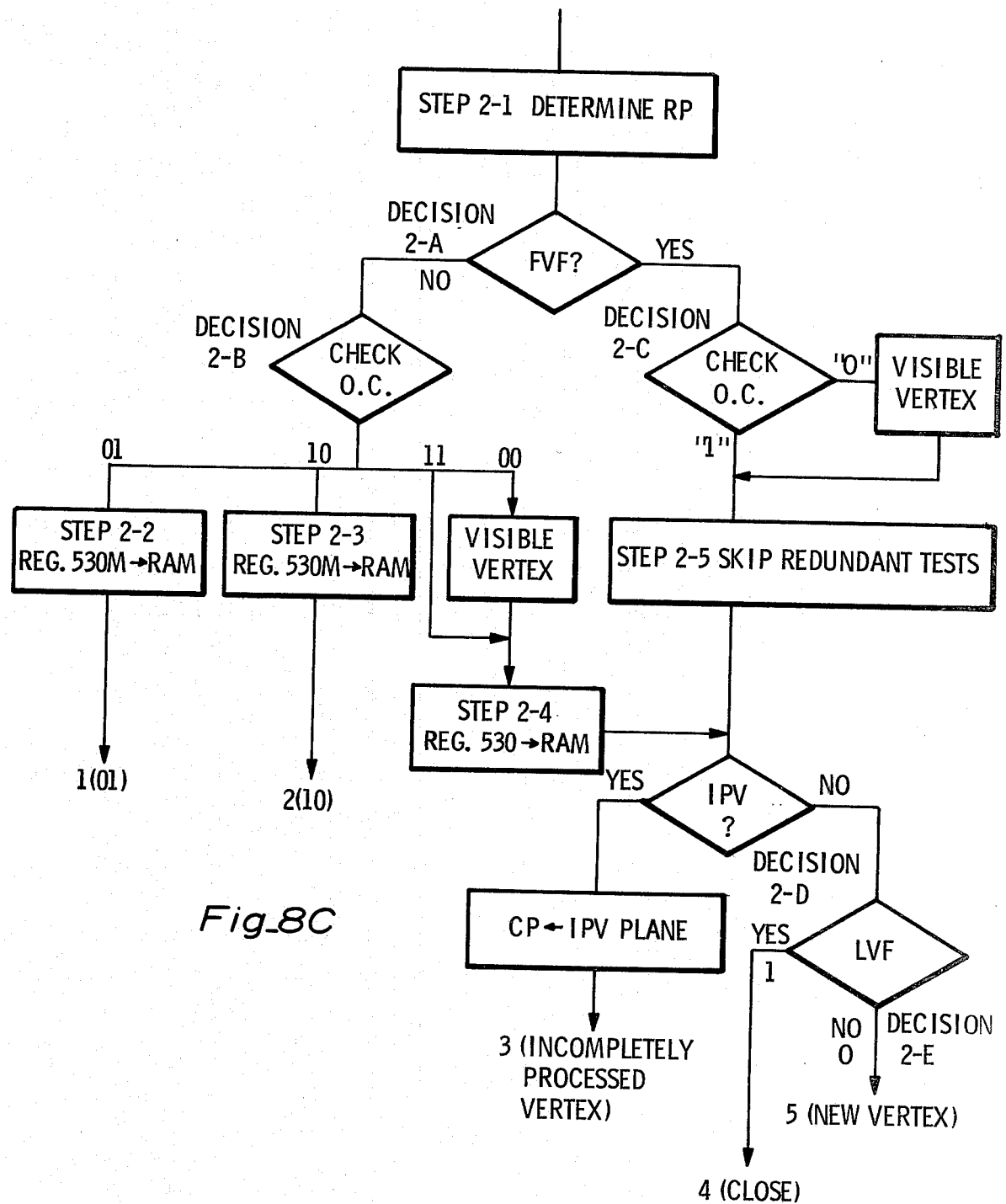
Fig_8C

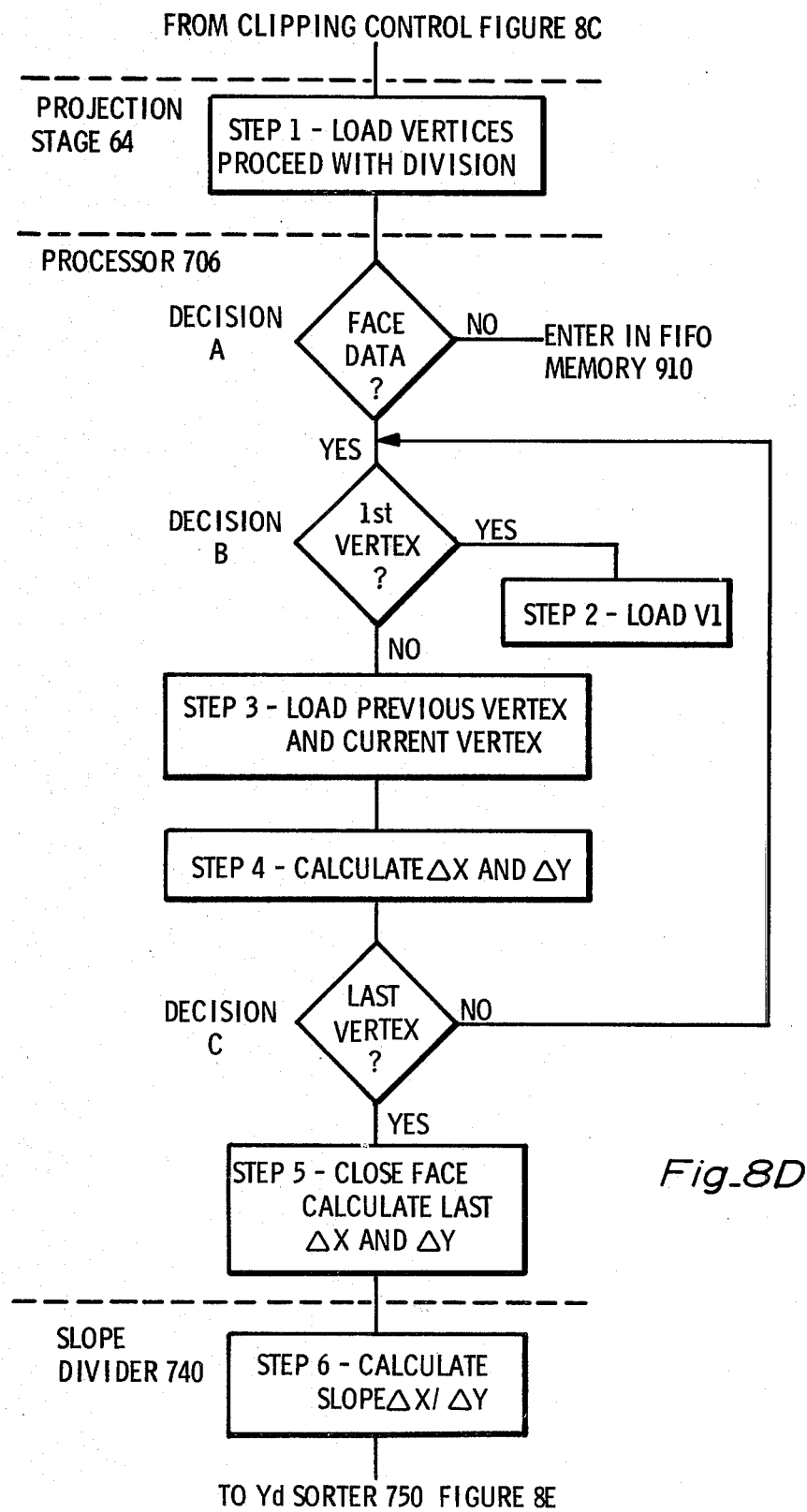
Fig_8D

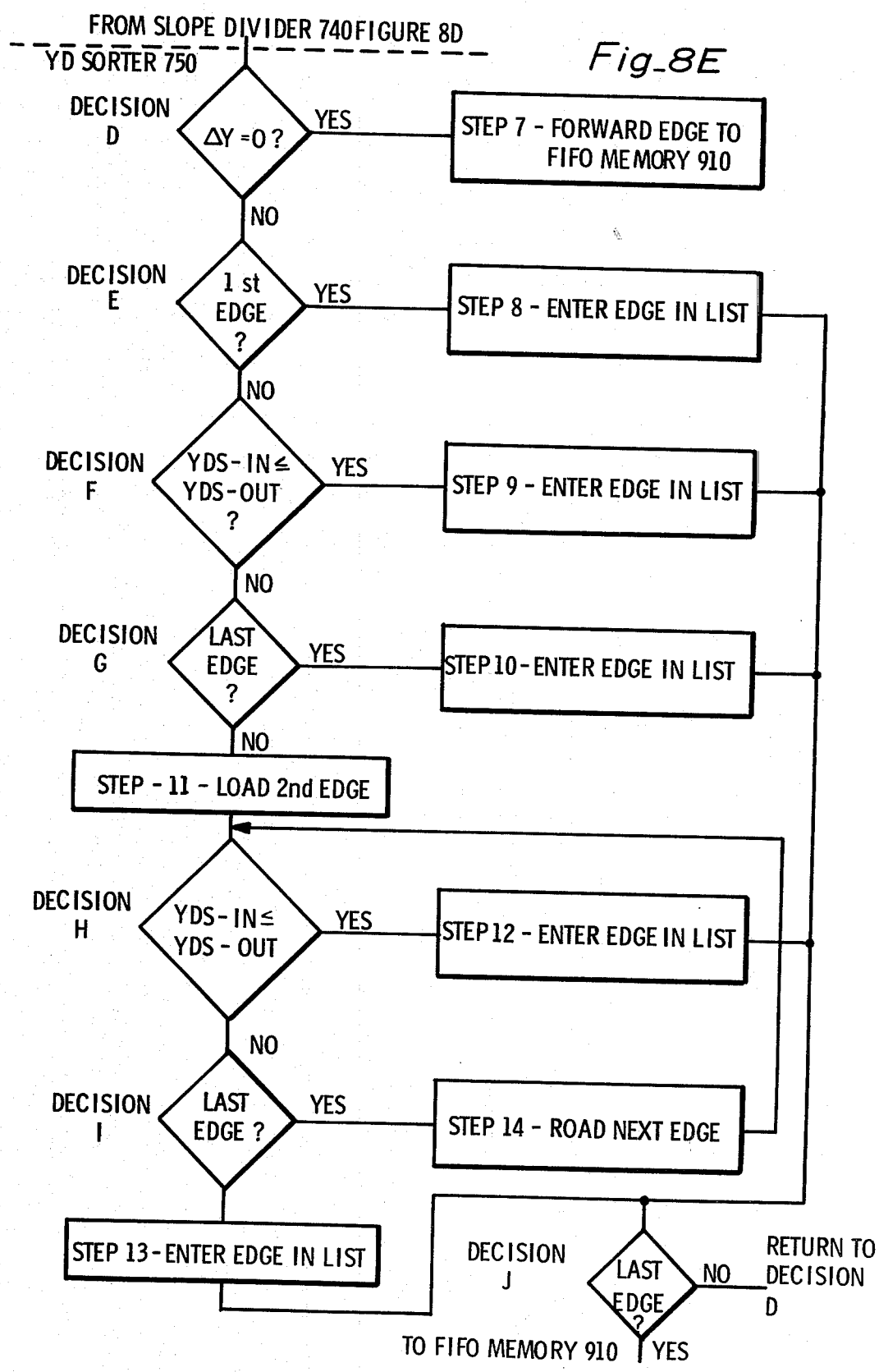
Fig_8E

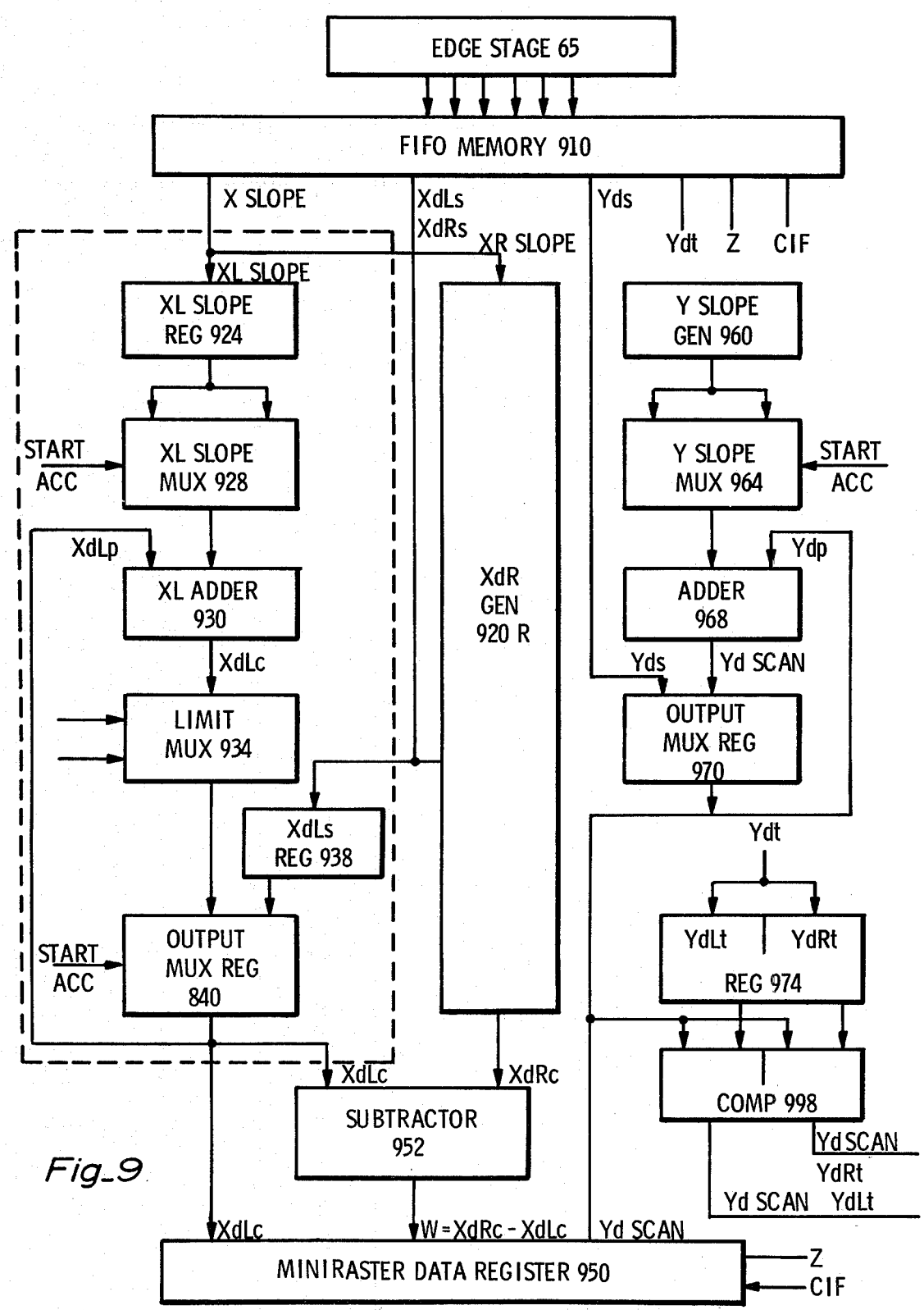
Fig_9

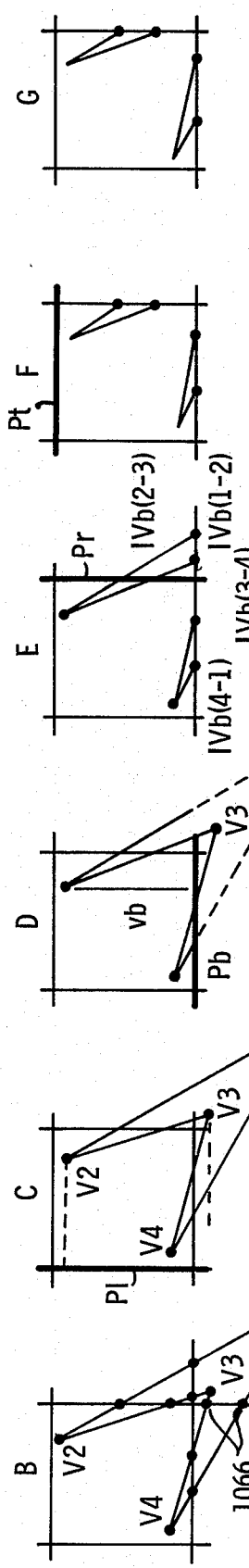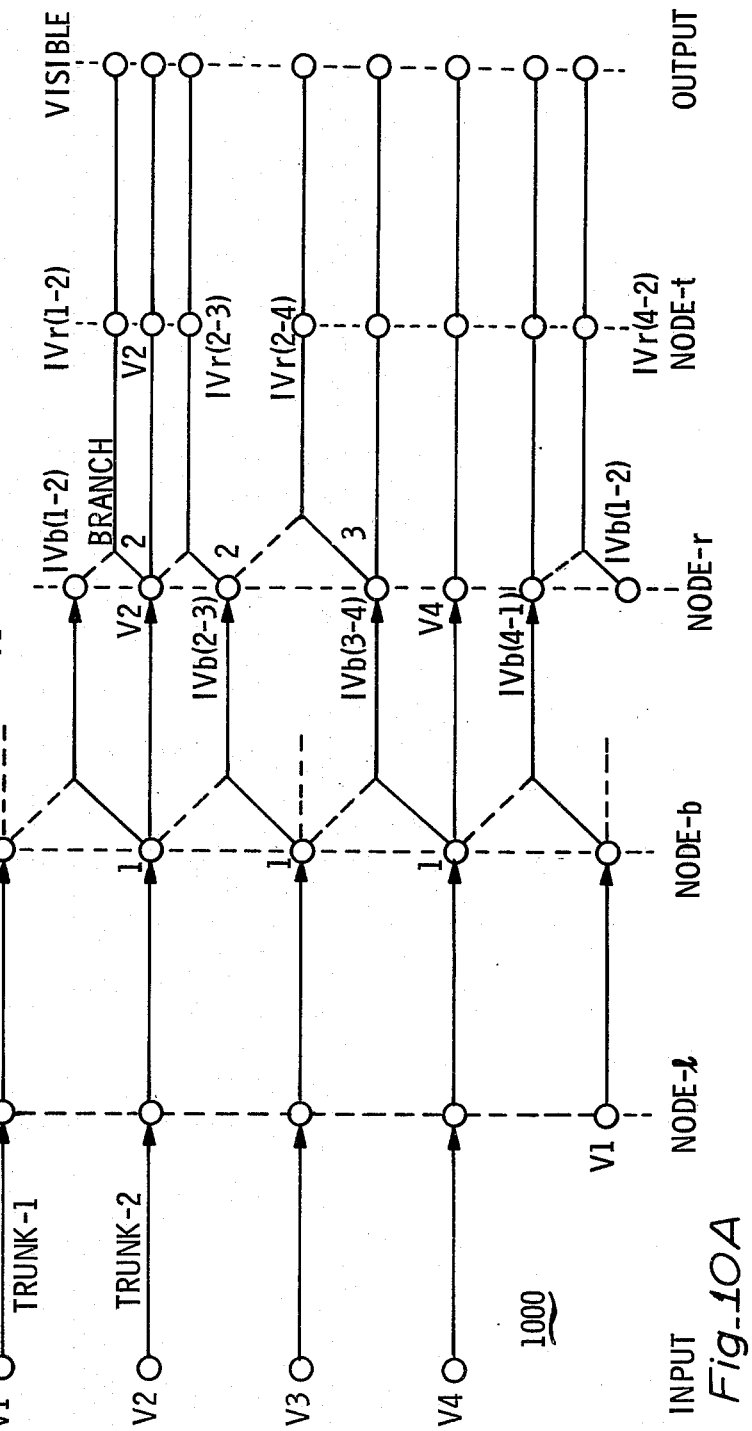
Fig.-10B
Fig.-10A

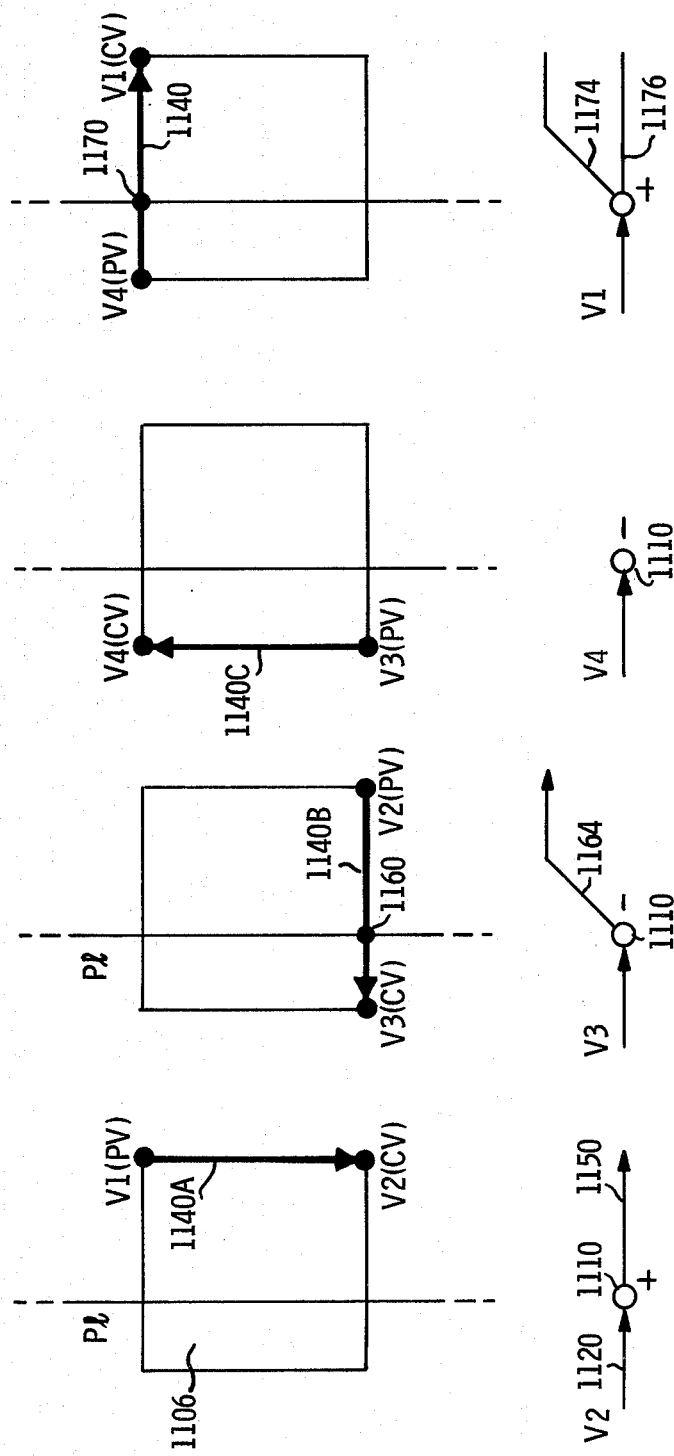

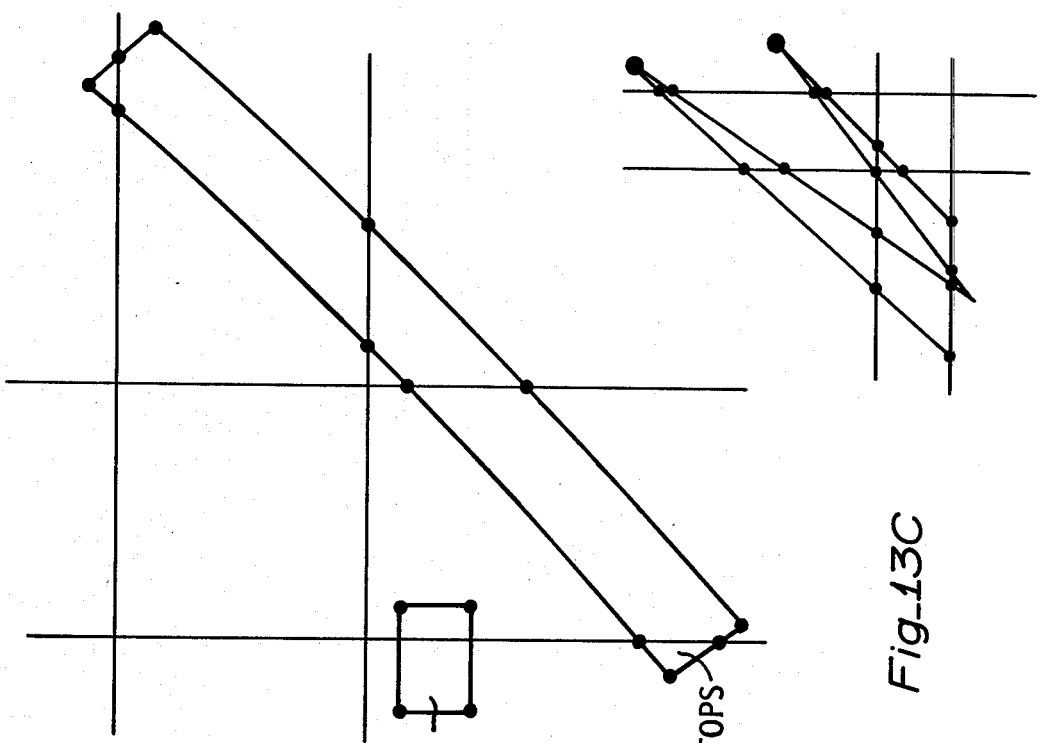
Fig_13C
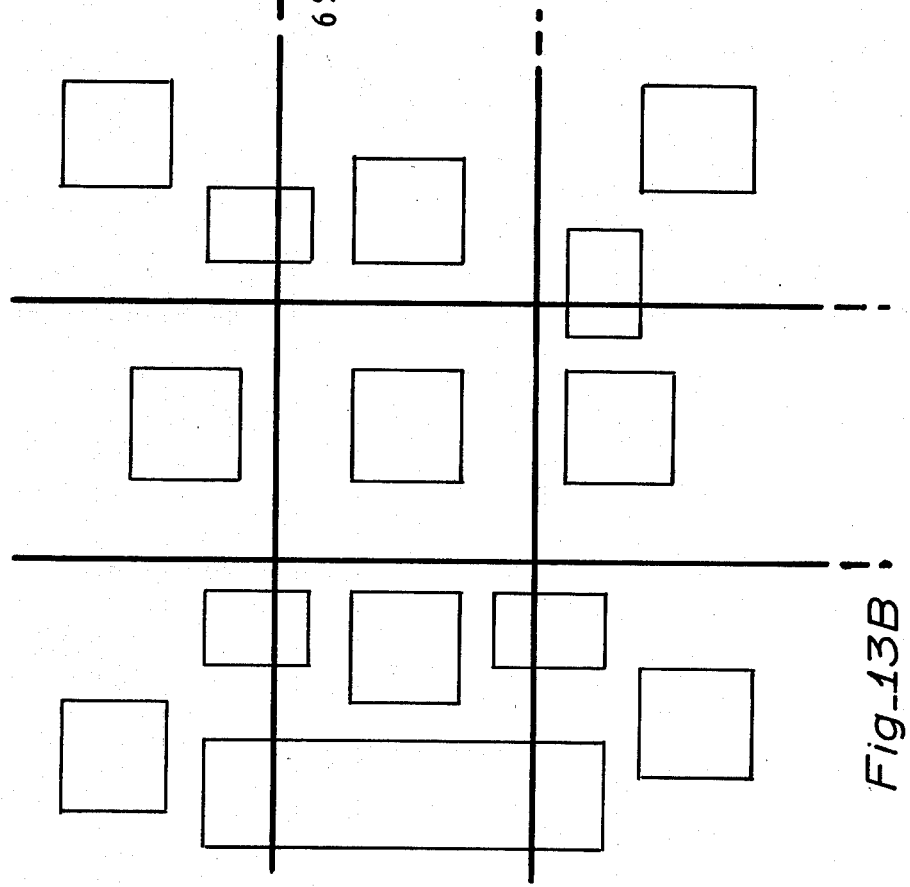
Fig_13B

CLIPPING POLYGON FACES THROUGH A POLYHEDRON OF VISION

The invention described herein was made in the performance of work under NASA Contract Number NAS9-14910 and is subject to the provisions of Section 305 of the National Aeronautics and Space Act of 1958 (72 Stat. 435; 42 U.S.C. 2457).

TABLE OF CONTENTS

TITLE
BACKGROUND OF THE INVENTION
SUMMARY OF THE INVENTION
DESCRIPTION OF THE FIGURES
GENERAL DESCRIPTION OF FLIGHT SIMULATION SYSTEM 10
DETAILED DESCRIPTION OF INTERFACE CONTROLLER 46 AND THE DATA FORMAT
DETAILED DESCRIPTION OF DIGITAL VISUAL COMPUTER 12 IMAGE PROCESSOR 42
TRANSLATION STAGE 60
ROTATION STAGE 62
CLIPPING STAGE 63
PROJECTION STAGE 64
EDGE STAGE 65
CONTROL LOGIC 70
DISPLAY GENERATOR 44
CLIPPING LOGIC
CONCLUSION
CLAIMS

BACKGROUND OF THE INVENTION

This invention relates to a flight or motion simulator display, and more particularly to continuously clipping data which is currently not within the display area.

Heretofore, clipping of polygon faces outside a pyramid of vision has been accomplished by continuously determining the distance or window coordinate between each pair of adjacent vertices within each polygon face, and each boundary plane forming the pyramid of vision. The side of each plane outside the pyramid of vision was negative (non visible) and the side including the pyramid of vision was positive (possibly visible). The sign bits of each window coordinate for each vertex were collected into a single data word—the "outcode". In the case of a square window, each outcode (O.C.) contained four sign bits. In a more recent approach, the clipping of the current face, the O.C. of each vertex was "tested" separately against each of the four boundary plane. Testing is the process of determining whether a vertex is on the plus or minus side of a particular boundary plane, and is accomplished by examining the appropriate sign bit. The O.C. contains sufficient information to determine the visibility of the corresponding vertex. If each bit of the O.C. is positive, then the vertex is within the pyramid of vision and visible. Testing is a procedure for gathering the visibility information. A four sided polygon face tested against a four sided pyramid of vision required 4×4+(4)=20 separate tests or examinations. The number of testing steps remained the same for faces entirely within view (Case A) partially in view (Case B) or entirely out of view (Case C). There was no reduction in the number of testing steps for the simple case A and case C±situations. However, more complex faces (and viewing volumes) required a proportionately greater number of tests.

In general case, the number of testing steps Tn required to clip a face was:

$$Tn = (Vn) \times (Pn) + (\text{closing tests})$$

where
Vn is the number of vertices in the face, and
Pn is the number of clipping planes forming the pyramid of vision This prior art-separate test clipping technique is shown in more detail in U.S. Pat. No. 3,639,736 and U.S. Pat. No. 3,816,726, both to Sutherland; and in an article by Sutherland and Hodgman entitled "Reentrant Polygon Clipping" appearing in "Graphics and Image Printing" (Communications of the ACM), January 1964, Volume 17 #1.

FIGS. 2-7, and 9 are identical to the corresponding Sections and Figures in U.S. patent application Ser. No. 869,210, filed 13 Jan., 1978, by Sullivan et al, entitled "Real-Time Simulation of a Polygon Face Object System as Viewed by a Moving Observer," and assigned to the present assignee.

SUMMARY OF THE INVENTION

It is therefore an object of this invention to provide a clipping system which is faster.

It is therefore another object of this invention to provide a face clipping circuit which requires fewer test steps than the product of the number of vertices of the face times the number of boundary planes forming the clipping volume.

It is a further object of this invention to provide a clipping device in which the number of clipping steps is not directly related to the number of clipping planes.

It is yet another object of this invention to provide a clipping circuit which combines certain groups of vertex-plane tests into a single test.

It is another object of this invention to provide a clipping circuit to minimize the number of tests required to close the polygon faces.

It is a further object of this invention to provide a clipping circuit in which each polygon face is processed and closed without repeating the first vertex.

It is yet a further object of this invention to provide a clipping circuit which keeps track of all incompleted intersection point branches developed during the clipping process.

It is another object of this invention to provide a clipping circuit having sets of memory pointers and sign flags assigned to the window-coordinates to reduce the data handling requirements.

It is a further object of this invention to provide a clipping circuit in which the window coordinate memory locations are shared among the plane testing hardware for reducing the number of memory access periods per test to one.

DESCRIPTION OF THE FIGURES

Further objects and advantages of the present invention, and the operation of the clipping system, will become apparent from the following detailed description taken in conjunction with the accompanying drawings, in which:

FIGS. 2A and 2B is a pictorial view of an aircraft and terrain features illustrating image vectors and O.C. regions;

FIG. 7 is a block diagram of edge stage 65 which identifies the edges of each polygon face and the slopes thereof;

FIG. 8 comprising FIGS. 8A–8E is a logic diagram of processor control logic 70;

FIG. 9 is a block diagram of miniraster calculator 72 which provides the starting points and widths of each scan line;

FIG. 10 comprising FIGS. 10A–10G is a clipping logic tree with accompanying face-outcode diagrams;

FIG. 11 comprising FIGS. 11A–11D is a diagram showing four possible clipping results between a line and a plane;

FIG. 13 comprising FIGS. 13A–13G is the logic tree of FIG. 10 showing each step of the clipping procedure.

GENERAL DESCRIPTION OF FLIGHT SIMULATION SYSTEM 10

Figure 1:
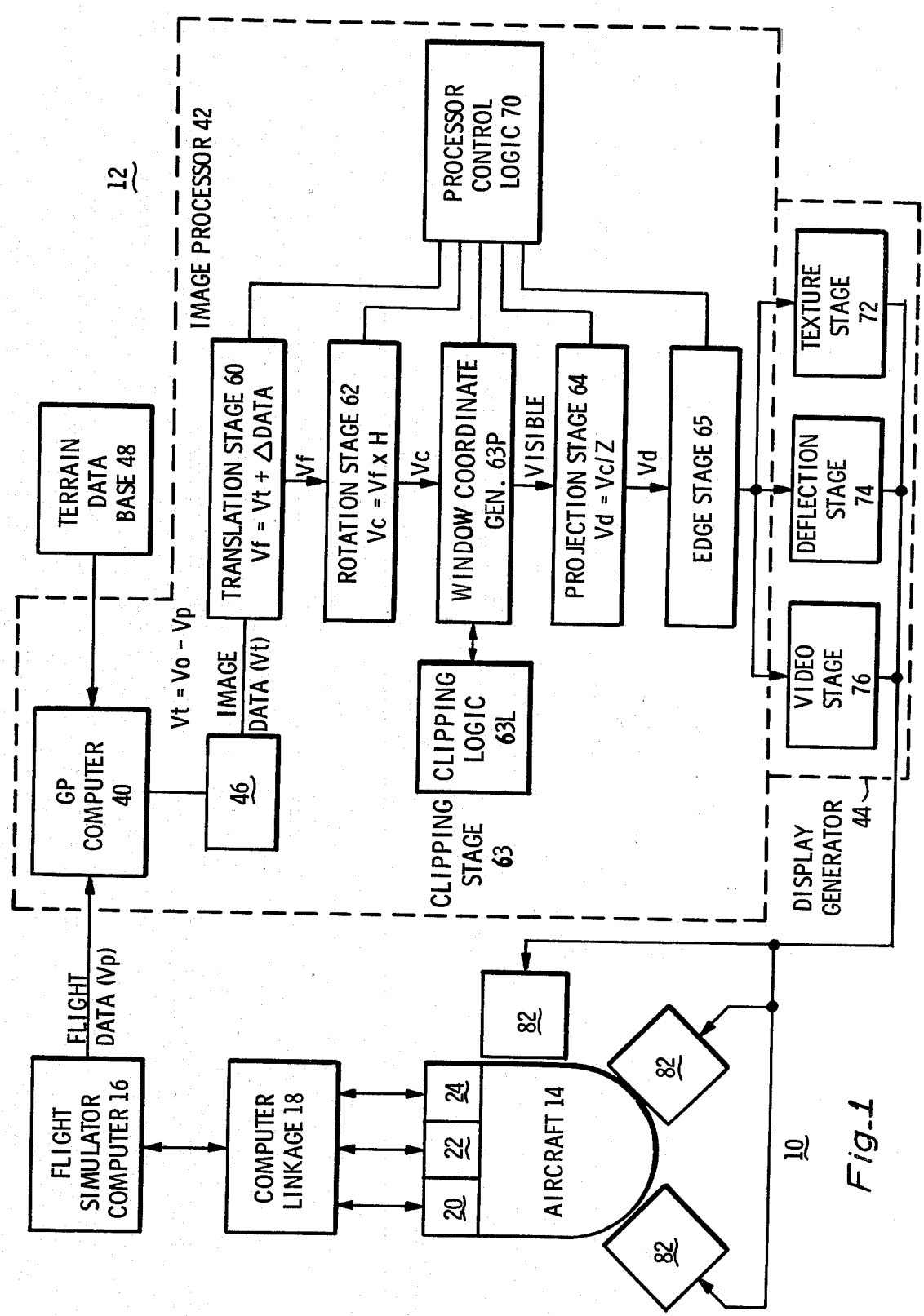
FIG. 1 is a block diagram of DIG visual system 10 and peripheral flight simulation equipment showing the data flow.

FIG. 1 shows flight simulation system 10 with visual capabilities provided by a digital visual system 12. A simulated aircraft 14 is linked to flight simulation computer 16 and visual system 12 through computer linkage 18. Flight computer 16 controls motion system 20 and instrument system 22 of aircraft 14 in response to the pilot's maneuvering action at aircraft controls 24. Visual system 12 is formed by general purpose computer 40 (such as Digital Equipment Corporation PDP 11/25) plus image processor 42, display generator 44. Interface controller 46, within image processor 42, is provided to process flight data from aircraft 14 to translation stage 60, and to control image data flow from GP computer 40 to image processor 42 via a data buffer.

GP computer 40 receives flight data, such as aircraft position Vp, aircraft roll, pitch, and yaw attitude (H matrix), etc., from computer 16. GP computer 40 additionally receives terrain data (both natural formations and cultural structures) from data base 48 such as runways, towers, hangers, roads, rivers, fields, moving objects, etc. In general visual system 12 may process and display terrain features consisting of points, lines closed polygons, or combinations thereof. Preferably the aircraft position data is an aircraft position vector VP extending from the simulated position of aircraft 14 to the origin of the terrain coordinate system (see FIG. 2). In order to simplify conception and data organization, the terrain origin is located proximate the touchdown area of the runway, and the x axis of the terrain coordinate system from data base 48 is coincident to the runway centerline. An updated Vp is supplied each frame period by flight simulation computer 16 as the flight parameters of aircraft 14 change. The earth data also includes the position of certain landmark points (Vo) such as the first vertex of each face, and the relative position of the points forming other terrain feature (delta data). Translation stage 60 subtracts Vp from each Vo to form translated vectors (Vt=Vo−Vp). Translation stage 60 then combines the delta with the appropriate Vt to provide the remaining face vertex vector Vf for each face (Vf=Vt+delta data). Rotation stage 62 compensates each Vf for changes in aircraft 14 orientation (pitch, roll, and yaw) for each window (channel) and forwards Vc to clipping stage 63. Faces which are not visible to the pilot because they are outside his field of vision are eliminated from the data flow within image processor 42 by clipping stage 63. In addition, clipping stage 63 reconstructs partially visible faces and forwards only the visible portion thereof to projection stage 64. Projection stages 64 projects the three-dimensional Vc into two-dimensional display coordinates or vectors Vd. Edge stage 65 provides a list of visible edges defined by the end points and the slope. The data flow through image processor 42 and the mode of operation thereof is controlled by processor control logic 70.

Texture stage 72 within display generator 44 receives the visible edge list for coordination with the display raster. Deflection stage 74 provides the required analog deflection voltages to CRT display devices 82. Video stage 76 receives the color, intrinsic intensity and size portion of the data for controlling the CRT beam voltage, current and focus. The CRT in device 82 is preferably a beam penetration, random deflection tube which allows precise control of spot position, continuous control of spot focus and diameter, and provides at least two phosphors of different colors.

DETAILED DESCRIPTION OF INTERFACE CONTROLLER 46 AND THE DATA FORMAT

GP computer 40 has an in-core, buffer memory which accumulates blocks of image data required to form each display frame. The in-core buffer contains initialization points (Vo) and delta data from data base 48 plus each new position vector Vp and rotational matrix (H) as they are computed by flight computer 16.

The inage data accumulating in the in-core buffer is periodically transferred as a data block to hardware RAM buffer 304 in interface controller 46. Controller 46 processes the data words sequentially to image processor 42 while GP computer 40 simultaneously assembles the next data block in the in-core buffer for the next data handshake with RAM 304. The accumulation of data blocks in GP computer 16 and the handshake data transfer to RAM 304 is outlined in the following four operations:

Operatin I—Preflight Load—Data Base 48 to Core Memory

Prior to each training flight, the content of data base 48 is loaded into computer 40 core-memory. Image data from data base 40 includes sixteen control words (0000–1111) having bit formats as described hereinafter, initialization data Vo, delta data, etc.

Operation II—Aircraft Orientation Update

The in-core memory is updated periodically with the most recent aircraft orientation angles roll, pitch and yaw (H matrix data) from flight computer 16. Preferrably, this aircraft update occurs once each frame. The H matrix data is received by computer 40 as the sine and cosine of each of the three orientation angles—six items of data. The software of computer 40 responds to the orientation data to form the rotational matrix H described in the specification (Section IX). The software merely calculates the proper sine-cosine products to form a 3×3 matrix for each angle, and multiplies the three 3×3 matrices together to generate the nine elements of the rotational matrix H. These nine elements are generated each frame and inserted into RAM 304 at the proper place. The nine elements of rotational matrix H preferrably occupy the lead position in the core-memory because the rotational perspective must be developed by rotation stage 62 each frame prior to displaying any of the object faces on display 82.

Operation III—Aircraft Position Update

The core-memory update also includes the most recent aircraft position vector Vp which latter forms a series of initialization vectors Vo in translation stage 60.

Operation IV—Handshake Between Core-Memory and RAM 304

As required the contents of the core-memory matrix are serially transferred to RAM 304 in interface controller 46, starting with the nine rotational elements.

The four above described operations involve simple software steps. Operations I, III, and IV are merely data transfer steps. Operation II involves forming a triple 3×3 matrix product, a mathematical operation which is well understood. Subroutines are available to execute this systematic multiplication.

FORMAT SUMMARY

The data format is formed by groups of data words which describe the nature and position of each object feature, and spaced instruction words for identifying the type of data in the immediately subsequent group of data words. The MSB bits of each instruction word are coded to define the particular instruction contained in the word, and the remaining bits concern the subsequent data. In the embodiment shown, a sixteen bit format is employed. The four MSB define the instruction and are decoded by processor control logic 70 to control the flow of data through image processor 42. The four LSB of each instruction word reveal the number of subsequent data words in the data word group to be processed under that instruction word. Each instruction word is loaded into registers 310A and 310B by control logic 70 in due course, and the immediately subsequent group of data words is loaded into RAM 350.

FIVE LOAD INSTRUCTIONS (0–4)

Each load instruction transfers point coordinates from buffer 306 into RAM 350 as follows:

```
            15    12 11  8 7  6     3      0
LDA (4)    |0 1 0 0|A A A A|R R|    |B B B B|
```

Load A instruction causes the subsequent group of B sets of X, Y, Z coordinates to be stored in RAM's 350X, 350Y, and 350Z, beginning at address A. The first coordinate (one of two sixteen bit words) is stored in the RAM 350X, the second in the RAM 350Y, and the third in the RAM 350Z. This sequence is repeated until B sets of coordinates have been loaded starting at address A. R specifies the significance of the bits in the subsequent sixteen bit data words for coordinating the distribution thereof across the 24 bits of RAM's 350.

Normal 24 bit resolution (R=3) requires two subsequent data words. The first word provides the sixteen LSB to RAM's 350 and the second word provides the 8MSB to RAM's 350. Vp and Vo data require the full 24 bits and therefore are preceded by an LDA instruction word with R=3. The LSB of Vp preferably corresponds to ⅜ of an inch to eliminate detectable jitter of the scene from frame to frame. A new Vp is calculated by FS computer 16 each frame, and the round-off error in the LSB of Vp causes the entire earth coordinate system to jump a ground distance equal to the LSB. This interframe displacement (motion resolution) is minimized and rendered indetectable to the pilot trainee by providing aircraft position vector (Vp) resolution at the ⅜ inch level. The LSB of Vo is preferably small in order to accurately position detailed structure within a terrain feature (positional resolution). In the embodiment shown, Vo LSB also equals ⅜ inch because image processor 42 is already required to handle the ⅜ inch bit in order to prevent interframe displacement. That is, the position resolution may have the same value as the motion resolution as in the embodiment shown; but it is not required that the two resolutions be equal. However, a ⅜ inch Vo position resolution permits moving objects such as other airplanes and ground vehicles to be viewed without interframe displacement. The MSB of both Vp and Vo is 262,144 feet forming a cubic gaming volume in data base 48 which is 262,144 feet on an edge.

Fine 16 bit resolution (R=1) requires a single subsequent 16 bit data word of delta data which is entered into the 16LSB of 24 bit RAM's 350 (bits 16–23 are loaded with the sign bit 15). The MSB corresponds to 1024 feet (when LSB=⅜ inch). The fine 16 bit resolution may be used to process the vertices of small terrain faces (largest dimension less than 1024 feet) which is associated with high resolution detailed structure.

Coarse 16 bit resolution (R=2) requires a single 16 bit subsequent data word of delta data which is entered into the 16 MSB of 24 bit RAM's 350 (bits 0–7 are loaded with "0"s). The MSB=262,144 feet and LSB=8 feet. The coarse 16 bit resolution may be used to process the vertices of large terrain faces in which the dimensions have been rounded off to multiples of eight feet. While the size resolution of these faces is eight feet, they are positioned with the same resolution as the associated Vo.

```
            15    12 11  8 7  6     3      0
LXY (3)    |0 0 1 1|A A A A|R R|    |B B B B|
```

Load XY instruction causes the subsequent group of B pairs of X and Y coordinates to be stored in the RAM 350X and RAM 350Y, beginning at address A. "0"s are stored in the corresponding addresses of the RAM 350Z. The data format is one or two 16 bit words of X data followed by one or two words of Y data. This sequence is repeated until B pairs of X-Y coordinates have been loaded into RAM's 350X and 350Y. The R codes are the same as for LDA.

```
            15    12 11  8 7  6     3      0
LDX (0)    |0 0 0 0|A A A A|R R|    |B B B B|
```

Load X instruction causes the subsequent group of B X coordinates to be stored in the XT RAM 350X beginning at address A. Zeros are stored in the corresponding addresses of RAM's 350Y and 350Z.

LDY (1) `[0 0 0 1|A3 A2 A1 A0|R R|   |B3 B2 B1 B0]`

Load Y instruction is the same as LDX except that the data is stored in RAM 350Y and "0"s are stored in the corresponding addresses in RAM 350X and RAM 350Z.

LDZ (2) `[0 0 1 0|A A A A|R R|   |B B B B]`

Load Z instruction is the same as LDX except that the data is stored in the RAM 350Z and "0"s are stored in corresponding addresses of RAM's 350X and 350Y.

FIVE RECALL INSTRUCTIONS (5-9)

Recall instructions load the first vertice Vo of each face into RAM's 350 and initiates generation of the associated face.

```
         15    11    8 7 6 4 3     0
RCA (9) [1 0 0 1|A A A A|R|S S S|B B B B]
```

Recall A instruction causes the single subsequent set of coordinates for the first vertice of a face, which typically is also an initialization vector Vo, to be loaded into the first location of RAM 350X, RAM 350Y, and 350Z. The other vertices of the current face have already been entered into RAM's 350 in CCW order as 16 bit coarse or fine data under one of the load instructions (0-4). These other vertices B are now recalled in CCW order from RAM's 350 beginning with address A of RCA. Normal 24 bit resolution (R=3) and coarse 16 bit resolution (R=2) have been previously described. S is a scale factor. When S=7, the current face is displayed full size. As S decreases the size of the current face is reduced by factors of 2.

RXY(8) `[1 0 0 0|A A A A|R| S S S |B B B B]`

Recall XY instruction causes the single subsequent set of first vertice Vo coordinates to be loaded into the first address of RAM 350X and then the first address of RAM 310Y. RAM 350Z is unaffected. The face generation then proceeds as described under RCA.

RCX(5) `[0 1 0 1|A A A A|R|S S S|B B B B]` ;

Recall X instruction causes the single subsequent X coordinate of the first vertice Vo to be loaded into the first address of RAM 350X. RAM's 350Y and 350Z are unaffected.

RCY(6) `[0 1 1 0|A A A A|R|S S S|B B B B]`

Recall Y instruction causes the single subsequent Y coordinate of the first vertice Vo to be loaded into the first address of RAM 350Y; RAM's 350X and 350Y are unaffected.

RCZ(7) `[0 1 1 1|A A A A|R|S S S|B B B B]`

Recall Z instruction causes the single subsequent Z coordinate of the first vertice Vo to be loaded into the first address of RAM 310Z; RAM's 350X and 350Y are unaffected.

RCL(10) `[1 0 1 0|A A A A|S S S|B B B B]` ;

Recall Load instruction does not load any new data into RAM's 350 but is the same as RCX in other respects. RCL is used to hold the previous Vo in order to construct another face contiguous with or proximate to the previous face using the previous Vo as the first vertice or a landmark point for establishing the position of the vertices of the contiguous face.

OTHER INSTRUCTIONS

```
          15    12 11    10  9 8    4 3    0
CIF(11) [1 0 1 1|SEL AXIS|S±|I I I I I|B B B B]
```

Color Intensity Flag instruction is followed by B additional words, i.e.,

```
              15    8 7     6    5 4    3 2    1    0
CIF1(B = 1) [Spares|OBJ CODE|FB|IOS|VER RES]
              15       10 9     4    3 2 1 0
CIF2(B = 2) [Color-|Color+|Col Sel|Spares]
``` which define the visual characteristics of each data base feature (face, line, or point). The visual characteristic of certain cultural objects such as signal beacons and runway lamps are a function of viewing direction and require directional data. SEL AXIS identifies the viewing axis to which the CIF data pertains:

SEL AXIS=00: the color and intensity of the object is uniform in all directions—ordinary object.
SEL AXIS=01: the color of the object depends on the direction of viewing along the X axis—bidirectional object.
SEL AXIS=10: bidirectional along Y axis.
SEL AXIS=11: birdirectional along Z axis.

S± (SIGN±) identifies the direction of view of the object along the axis identified by SEL AXIS. COLOR± identifies the color of the object when viewed from the S+ direction, and COLOR− identifies the color of the object when viewed from the S− direction. COL SEL permits ordinary non-direction features to be displayed in a color from COLOR+ (COL SEL=0) or from COLOR− (COL SEL=1). I (INTENSITY) determines the intensity of the data base feature. When only an intensity change is required to display the current object, only CIFO (B=0) is employed. OBJ CODE identifies the type of object to be recalled:

| OBJ CODE | | |
|---|---|---|
| = 000: | 3 dimensional face (a face having a vertical component). Most 3D faces form part of a 3 dimensional object such as the side or top of a building. |
| = 001: | Spare. |
| = 010: | Spare. |
| = 011: | Face to line, such as runway stripes which narrow down to a line with distance. |

```
= 100:  Sky.
= 101:  Line.
= 110:  Light point.
= 111:  2 dimensional face, a completely
        horizontal face in the X-Y plane.
```

Figure 2:
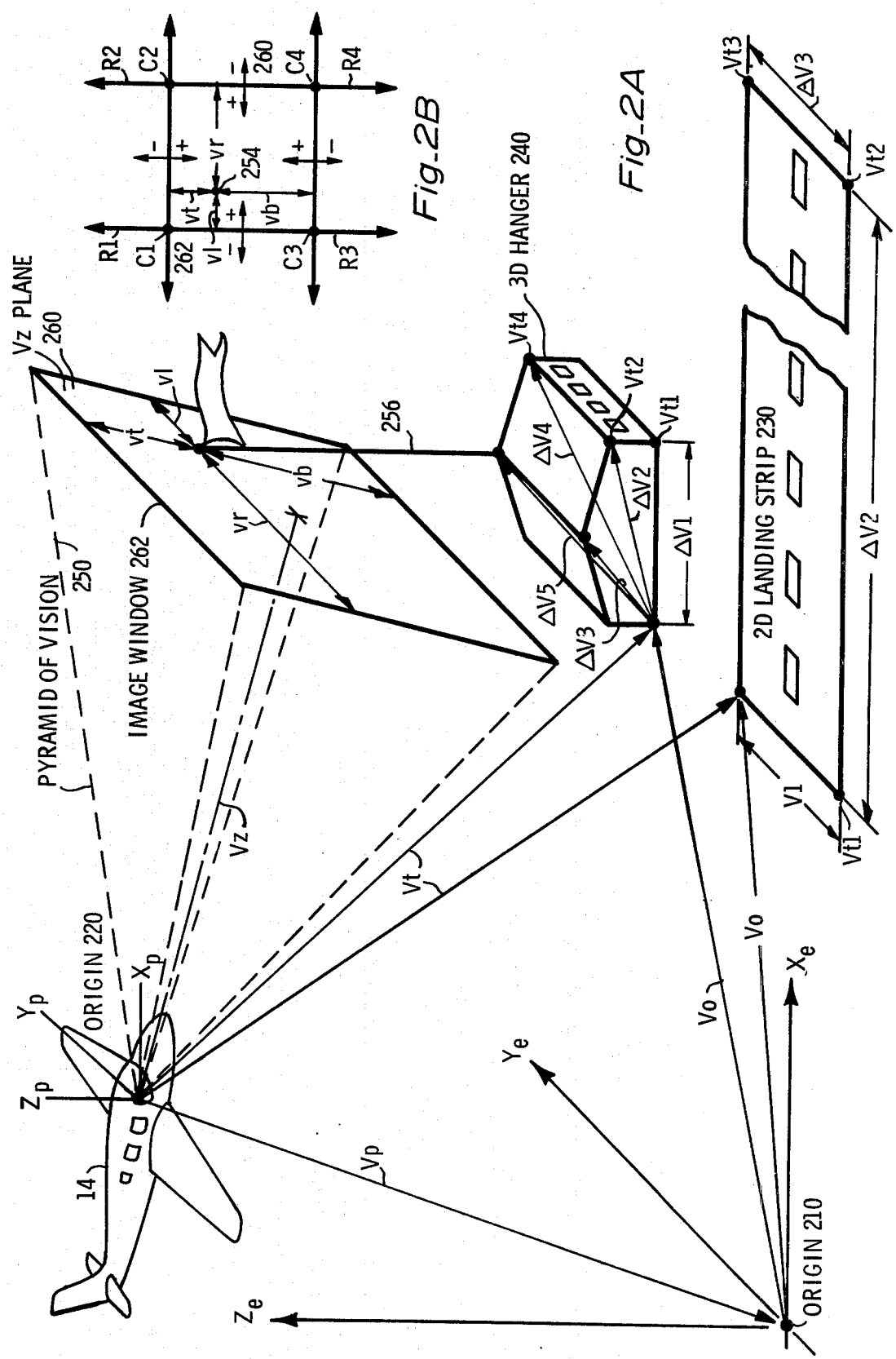
FIG. 2 comprising

The use of Recall instruction as illustrated in FIG. 2a is different for two dimensional faces on the X-Y ground plane (which always face the observer) and faces of a 3 dimensional object (which are sometimes occluded), as illustrated in FIG. 2. Two dimensional faces are identified by a 2 D face object code in the previously loaded CIFI data. RCX computes the vertices of each face by starting with the X, Y, Z coordinates of Vo stored in the first address of RAM's 350 and combining additional vector coordinates from RAM's 350 starting at address A. B is the number of vertices in the face, and, since Vo is the first vertex, B-1 additional vectors (Delta V1, Delta V2, . . . Delta VB-1) are required to generate the other vertices. The vertices are always stored and retrieved in counter-clockwise order. Three dimensional faces are identified by a 3 D object code. Vo is not used as a vertex for 3 D faces, so that B additional vectors (Delta V1, Delta V2, . . . Delta VB) are required to display a face having B vertices. The RAM addresses containing the additional vector coordinates for 3 D faces are provided by one or two data words 3DV1 and 3DV2 following the X data word or words. Each additional vector in 3 D recall describes the position of a vertex with respect to Vo as opposed to a 2 D recall, in which each additional vector describes the position of a vertex with respect to the previous vertex. The address format for additional 3 D vectors in RAM 350 is

```
        15    VR    VR    VR    VR  0
V1     |DDDD|CCCC|BBBB|AAAA|  first word
        15    VR    VR    VR    VR  0
V2     |HHHH|GGGG|FFFF|EEEE|  second word
```

If the face has four or fewer vertices, only the first word is used. The order in which the RAM 350 addresses are used to reverse alphabetical. For example, when recalling a face having five vertices, the first vertex will be computed using the vector stored at E. The last vertex is always stored at A. A in the RCX instruction is also the address of the normal vector stored in normal RAM 440N. The normal vector is used to test the visibility of a face and must have been previously loaded in normal RAM 440N using a LDN instruction (described hereinafter). Scale factor is the same for a 3 D face as for a 2 D face.

FB identifies data fed back for CRT correction to eliminate ballistic nonlinearities and provide a true display.

IOS identifies data displayed on the instructor's monitor 28 only.

VER RES determines the scan line density (vertical display resolution in horizontal lines per vertical scan).

```
VER RES  = 000:  128 lines low resolution for rapidly
                 painting structureless large areas
                 such as the sky with a defocused
                 electron beam.
         = 001:  256
         = 010:  384
         = 011:  512
         = 100:  640
         = 101:  768
         = 110:  896
         = 111:  1024 lines high resolution for painting
                 detailed objects.
```

```
          15  1211    87          0
LCD(15)  |1 1 1 1|    |C C C C C C C C|
```

Load Correct Data instruction enters C vertices with corrected CRT coordinates.

```
          15
STG(12)  |1 1 0 0|A A A A|C C C C C C C C|
```

Control String instruction causes the display of string of C equally spaced lights or four-sided two dimensional faces, depending on the CIF1 OBJ CODE. The first light of a string is displayed at the Vo+A position and a spacing vector stored at A+1 is used to fix the position of the second light and all successive lights until C lights have been dislayed. The first vertex of the first face of a string of faces is displayed at the Vi+A position and the other three vertices are found successively adding the vectors stored at RAM's 350 addresses A+1, A+2, and A+3. The vector stored at A+4 locates the first vertex of the next face with respect to the last vertex of the current face.

```
          15   12      87  65  43       0
LDH(13)  |1 1 0 1|A A A A| 0 |C C|B B B B|
```

Control Load H instruction loads the H rotation matrix on data bus 307 into RAM 410H in rotation stage 62. The elements of the rotation matrix are in 16 bit 2's complement form, and each address of RAM 410H will store three elements. The rotation matrix multiplies the translated X, Y, and Z coordinates in the following form:

$$\begin{bmatrix} h11 & h12 & h13 \\ h21 & h22 & h23 \\ h31 & h32 & h33 \end{bmatrix} \begin{bmatrix} XT \\ YT \\ ZT \end{bmatrix} \begin{bmatrix} XR \\ YR \\ ZR \end{bmatrix} = \begin{array}{l} h11\ XT + h12\ 1/T + h13\ ZT \\ h21\ XT + h22\ YT + h23\ ZT \\ h31\ XT + h32\ YT + h33\ ZT \end{array}$$

The element data follows the LDH instruction in the following order:
 h31, h32, h33, h21, h22, h23, h11, h12, h13.
The matrix is always stored in the first three addresses of RAM 410H, so A=0, the initial address and B=3, the number of matrix rows. C is the channel number associated with rotation matrix.

```
          15  1211    8 7 6 3      0
LDN(14)  |1 1 0 1|A A A A|1|  |B B B B|
```

Control Load N instruction loads B face normal vectors on data bus 307 into normal vector RAM 440N in rotation stage 62, starting at address A. Each vector consists of three 16 bit data words in order Nx, Ny, Nz. The Control Load N will therefore always be followed by three B words of data. Each address in normal RAM 410N is associated with a three dimensional face of identical address in RAM's 350. Both RAM's are addressed during the Control Recall of a 3 D face.

DETAILED DESCRIPTION OF DIGITAL VISUAL COMPUTER 12

Each stage of digital visual system 12 is shown in detail in FIGS. 3 through 9. Preferred embodiments are disclosed at the detailed logic level. Each component is described by function, input-output characters, or conventional nomenclature to enable one skilled in the arts of simulation, digital design, and computer programming to practice the invention. The components are additionally designated by the manufacturer's IC type number from the following integrated circuits data books:

Texas Instruments Incorporated
"The TTL Data Book of Design Engineers"
First Editiion, Copyright 1973

National Semiconductor Corporation
"Digital Integrated Circuits"
January 1974

Advanced Micro Devices Inc.
"Advanced Micro Devices Data Book" Copyright 1974 unless otherwise secified. Further, many inverters are employed throughout CDIG system 10 for buffering signals with multiple loads. These buffer inverters are type 74S04 unless otherwise stated.

TRANSLATION STAGE 60

GENERAL OPERATION

Figure 3:
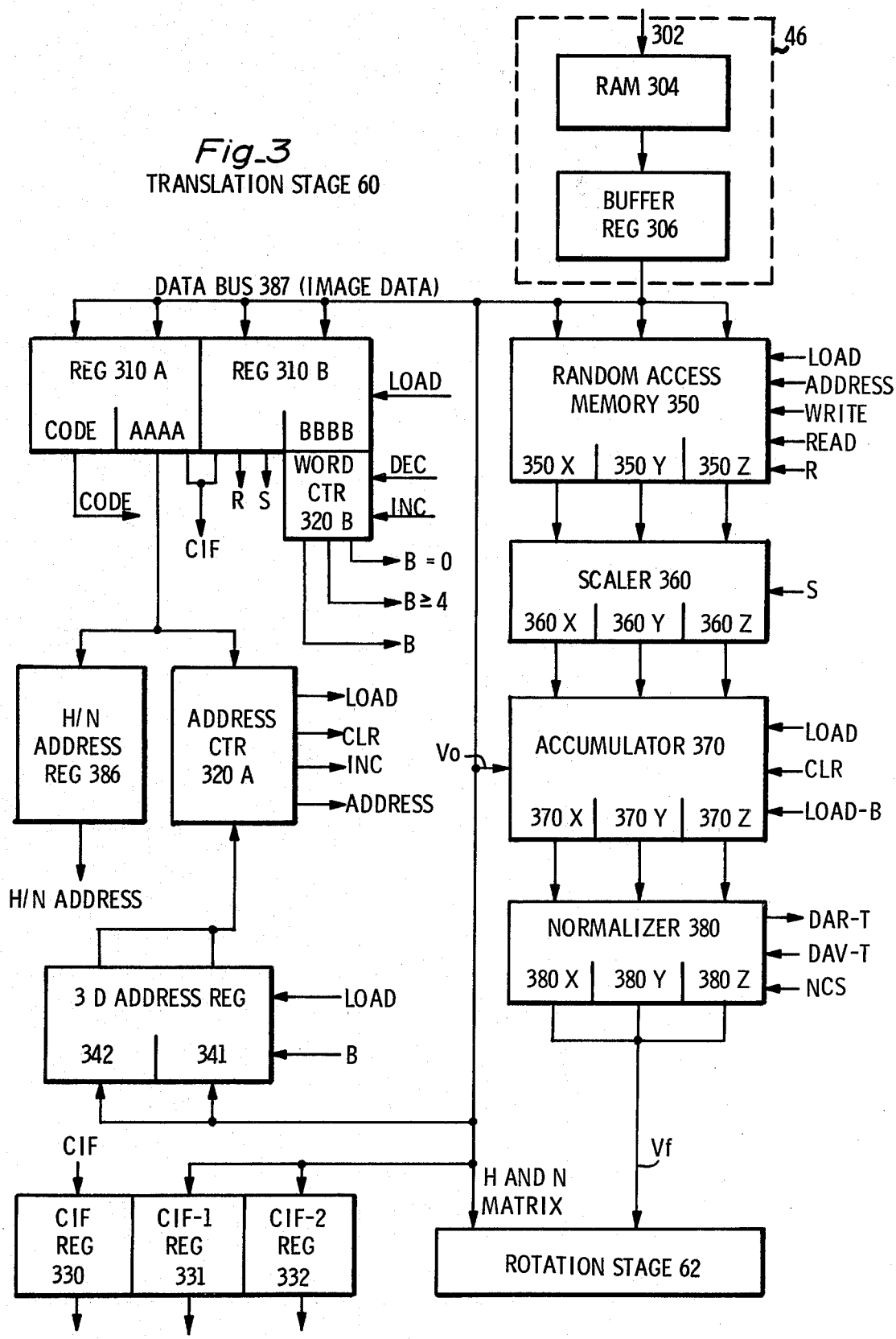
FIG. 3 is a block diagram of translation stage 60 wherein the delta data is translated into face vertex vectors Vf.

FIG. 3 shows translation stage 60 of image processor 42 and a portion of controller 46. Controller 46 receives image data in sequential order from computer 40 at input 302 of random access memory 304. The image data is arranged in data blocks M bits wide and N words long, which in the embodiment shown is 16×1024. RAM 304 periodically handshakes with a core memory in GP computer 40 to reproduce each block of data. Image data is sequentially transferred from RAM 304 through a buffer register 306 to image data bus 307 in response to load pulses from interface controller 46.

Each instruction word on bus 307 is loaded into instruction registers 310 A and B which forwards the code bits (four MSB's) to control logic 70. Control logic 70 then selectively activates the remaining blocks of translation stage 60 for processing the subsequent B words of data appropriately. Load instructions (0-4) cause control logic 70 to send WRITE to RAM's 350, which then writes the subsequent B data words starting at ADDRESS A. Counter 320A increments ADDRESS A while counter 320B decrements down from B. When the B count expires, B=0 is forwarded to logic 70 and the next instruction is loaded into instruction registers 310.

Vp is loaded into RAM's 350 by a Load A instruction (R=3) immediately after each handshake, and Vp is always positioned at the same address (address 1). Next, B words of delta data vectors is entered by another load instruction.

Recall instructions (5-9) load the Vo associated with the previously loaded B words of delta data. Each Vo is positioned at the same address in RAM 350 (address 0). The recall instruction causes control logic 70 to forward READ to RAM's 350, and the B words of delta data are recalled from RAM's 350 and processed through the remainder of translation stage 60.

CIF instruction causes control logic 70 to forward LOAD to CIF register 330 to receive SEL AXIS, SIGN±, and Intensity data from instruction registers 310. B subsequent data words are entered into CIF-1 register 331 an CIF-2 register 332 where the CIF data is temporarily held. The CIF data is advanced into corresponding CIF registers 460 in rotation stage 62 as Vf data enters rotation stage 62 from normalization register 380.

Three dimensional vertex registers 341 and 342 receive the addresses of vertices of 3 D faces in RAM 350. The addresses in registers 341 and 342 address RAM's 350 via address counter 320A.

RAM's 350 write image data from interface controller 46 after load instructions and read image data after recall instructions. RAM's 350 temporarily store Vp and delta V's until the associated Vo is entered permitting the faces to be generated.

Scalers 360 (X, Y, and Z) control the size of the displayed image by expanding or contracting the X, Y, and Z position coordinates by factors of two. S data from register 310B shifts the binary decimal point to effect the scaling.

Accumulators 370 receive the X, Y, and Z position coordinates and perform the following translation computations (illustrated in FIG. 2):

basic translation: from the origin 210 of data base coordinate system to the origin 220 of aircraft 14 coordinate system $$Vp+Vo=Vt$$

2 D translation: from initial vertex to the remaining vertices sequentually—cumulative (landing strip 230)

$$Vt+\text{Delta } V1 = Vt1$$

$$Vt1+\text{Delta } V2 = Vt2$$

$$Vtn+\text{Delta } (Vn+1) = V(tn+1)$$

3 D translation: from initial vertex to each remaining vertex separately—non cumulative (hanger 240)

$$Vt+\text{Delta } V1 = Vt1$$

$$Vt+\text{Delta } Vn = Vtn$$

Normalization registers 380 (X, Y, and Z) loads the translated vertices Vt, and left shifts leading zeros (or ones for negative Vt's) in response to control logic 70. The first difference between the MSB and the second MSB in any of the normalization registers 380 generates a normalization complete signal, (NCS), back to control logic 70. Normalization complete in any of the normalization registers 380 stops the normalization process of all the registers insuring that the normalized points maintain consistent dimension units and remain on the same line of vision as viewed on display 82. Normalization has the advantage of reducing the 24 bit input image data into bits of normalized image data by eliminating either leading zeros (or ones for negative numbers). The data load is reduced to 66% with negligible loss in position resolution.

DETAILED DESCRIPTION

RAM 304 may be formed by a 16 bit × 24 word RAM (sixteen 93415's, Fairchild) for holding the block of image data from GP computer 40.

Buffer register 306 may be formed by a 16 bit register (four 74S175's) followed by buffer inverters as required (74S04).

Register 310A may be an eight bit register (two 74S175's) for receiving four bits of code (4MSB) and four bits of RAM address (4LSB).

Register 310B and word counter 320B may be formed together by an eight bit down counter (two 74S163) for receiving the compliment of B and counting to 15. At B compliment=15, B=0 appears on the carry out terminal.

Address counter 320A may be a 2:1 inverting multiplexer (74S158) followed by a four bit up counter (one 74S163). During load and recall instructions, counter 320A increments the start address AAAA to RAM's 350. While processing three dimensional faces counter 320A processes the face vertex addresses in three D registers 341 and 342.

CIF register 330 may be an eight bit register (two 74S175) for receiving eight bits of SEL AXIS, S± and Intensity Data from the CIF Load instruction.

CIF-1 and CIF-2 registers 331 and 332 may be 16 bit registers (four 74S174) for receiving two 16 bit words of CIF data immediately following the CIF instruction.

Three dimensional registers 341 and 342 may be eight 4 bit tristate registers (eight 8551) preceded by a 3 line to 8 line decoder (one half 74S139) which enables one of the eight tristate registers in response to the three LSB's of B from word counter 320B.

RAM 350X may be a 24 bit RAM (six 74S189's) to accomodate the 24 bits of X coordinate image data. The 24 bit RAM is preceded by a 2:1 8 bit multiplexer (two 74S158) between a pair of true compliment zero one elements (two 74H87's each). During 16 bit fine resolution (R=1) the right hand zero one element forwards the 8 LSB's of the image data to the 24 bit RAM, and the righthand zero one element enters all zeros (or all ones depending on the sign of the image data). During 16 bit coarse resolution (R=2) the right hand zero one elements enters all zeros and the lefthand zero one element forwards the 8 MSB's.

Scaler 360x may be formed by a flow through right shifter device (twelve 25S10's AMD) in response to S data from register 310B counter.

Accumulator 370x may be a 24 bit adder (six 74283's) for receiving data at the A input, followed by a 24 bit return register (six 74S175's) which outputs to the B input. Vp is processed through the adder and return register, and returned to the B input. Vo is loaded at the A input and added to Vp to form Vt and returned to the B input. Delta data is then loaded at the A input and added to Vt to form the remaining vertice vectors Vfl-Vfn, which are advanced through the return register to a 24 bit buffer register (four 74S174's) where the Vf's are held until normalizer 380x is free.

Normalizer 380x may be formed by a 24 bit shift register (three 74199) plus a Buffer register (four 74S174's) which holds the normalized Vf's until rotation stage 62 is free to handle the next Vf.

ROTATION STAGE 62

GENERAL-H MATRIX

Figure 4:
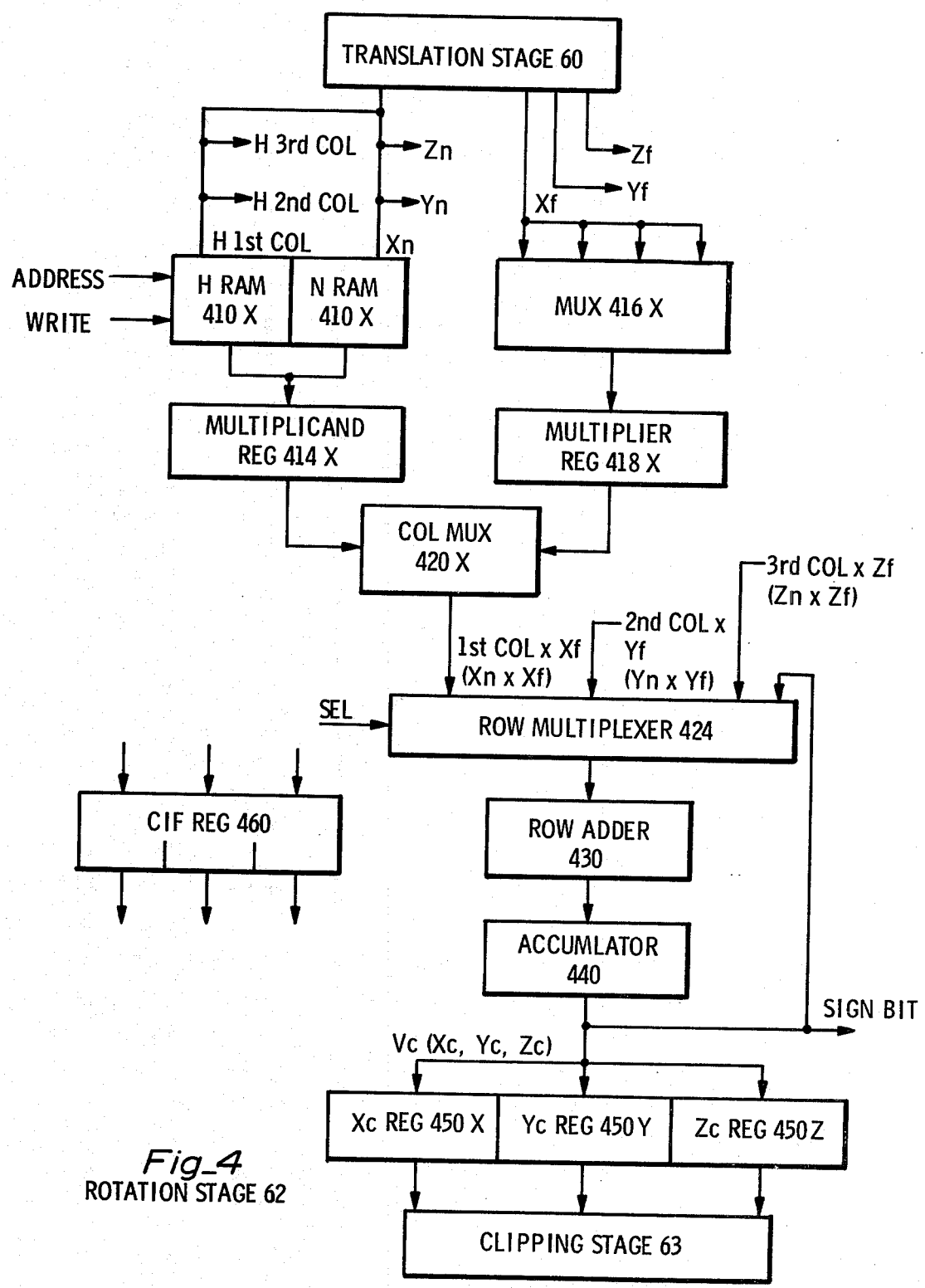
FIG. 4 is a block diagram of rotation state 62 wherein each Vf is multiplied by an H matrix.

FIG. 4 shows rotation stage 62 of image processor 42 which multiplies the translated point vectors Vfl-Vfn from translation stage 60 by the rotation matrix H provided on data bus 307 to produce a rotated or channel vectors Vc (XcYcZc):

$$\begin{matrix} Xc \\ Yc \\ Zc \end{matrix} = \begin{matrix} Xf \\ Yf \\ Zf \end{matrix} [H]$$

Each channel corresponds to the perspective view from one window of aircraft 14.

The rotation matrix H is developed from yaw (Y, left), pitch (P, down), and roll (R, right) motions by flight simulator 16 using conventional software. The order of rotation is Y followed by P, and the matrices for the separate rotations from translated to rotated pilot eye or channel coordinates are as follows:

$$HY = \begin{bmatrix} \cos Y & \sin Y & 0 \\ -\sin Y & \cos Y & 0 \\ 0 & 0 & 1 \end{bmatrix}$$

$$HP = \begin{bmatrix} \cos P & 0 & -\sin P \\ 0 & 1 & 0 \\ \sin P & 0 & \cos P \end{bmatrix}$$

$$HR = \begin{bmatrix} 1 & 0 & 0 \\ 0 & \cos R & \sin R \\ 0 & -\sin R & \cos R \end{bmatrix}$$

The composite matrix H describing this rotation is given by the matrix product:

$$[H] = [HR][HP][HY] = 3 \text{ columns} \times 3 \text{ rows matrix}$$

The aircraft attitude matrix H is constant for each frame and is therefore computed only once per frame for each channel.

The three elements of the first column of the H matrix are entered into H RAM 410x by WRITE from control logic 70 immediately subsequent to the Load H instruction. The first column is then multiplied by the Xf coordinate of each of the translated vector series Vfl-Vfn in turn within column multiplier 420X. The three elements of the second and third columns of [H] are similarly entered into H RAM 410Y and 410Z (not shown). The nine products generated above are combined into Xc, Yc, and Zc by row multiplexer 424 and adder 430. The resulting Vc is forwarded to clipping stage 63.

GENERAL-VISIBILITY TEST

The rotation circuitry also provides the multiplication for the dot product visibility test for the faces which form three dimensional structures such as buildings:

$$Vt \text{ dot } Vn = M \cos P$$

where:
Vt is the translated vector extending from aircraft 14 to the first vertex of the face being tested; and
Vn is the vector normal to the face being tested.

When cos P is negative, P is greater than 90° and the face is visible—on the front or exposed side of the building. When cos P is positive, P is less than 90° and the face is invisible—on the back side of the building. The sign bit of the dot product is employed for back side elimination—a simple occulting technique.

The Xn, Yn, and Zn coordinates of Vn are entered into N RAM's 410X, Y, and Z respectively immediately subsequent to the Load N instruction. Each coordinate is multiplied by the corresponding coordinate Xt, Yt, and Zt of Vt in multipliers 420 and the sign bit of the resulting quantity is forwarded to control logic 70.

DETAILED DESCRIPTION

H RAM 410x may be a 16 word by 16 bit sequential access memory (four 74S189's) for holding the three words in the first column of the 3×3 H matrix and providing 13 spare 16 bit addresses. WRITE and ADDRESS are provided by control logic 70.

N RAM 410x may be a 16 word by 16 bit random access memory (four 74S189's) for holding up to sixteen words of Xn which accomodates a three dimensional complex structure with up to sixteen faces.

Multiplicand register 414x may be a 16 bit buffer register (four 74S175's) for holding the current output of H and N RAM's 410x available to multiplexer 420x while the next address in RAM's 410x are accessed.

MUX 416x may be a 16 bit dual 4-1 multiplexer (three 74S153's) for providing four bits of output plus carry over bit.

Multiplier register 418x may be a 5 bit buffer register (one 74S174) for holding the output of MUX 416x available to multiplier 420x.

Column multiplier 420x may be formed by eight AM 25S05's (Advanced Micro Devices in 16 bit×4 bit configuration) followed by a buffer product register (three 74S175's) and operates as described in connection with Multiplier 330 in U.S. Pat. No. 3,996,672 which issued Dec. 14, 1976.

Row Multiplexer 424 may be a 20 bit 4 to 1 multiplexer (ten 74157's connected in parallel) which sequentially select the first row elements of each column for summing in row adder 430 to form Xc. The second and third row elements are likewise summed to provide Yc and Zc.

Row adder 430 may be a 20 bit adder (five 74783's) for summing the row products of the H matrix.

Accumulator 440 (three 74174's) returns intermediate sums to multiplexer 440 which are required in forming Vc.

Buffer registers 450 may be 18 bit registers (four 74175's) for holding Vc (Vx, Vy, Vz) prior to clipping.

CIF register 460 may be a 40 bit register for holding the CIF data from CIF registers 330, 331, and 332.

CLIPPING STAGE 63

General

Figure 5:
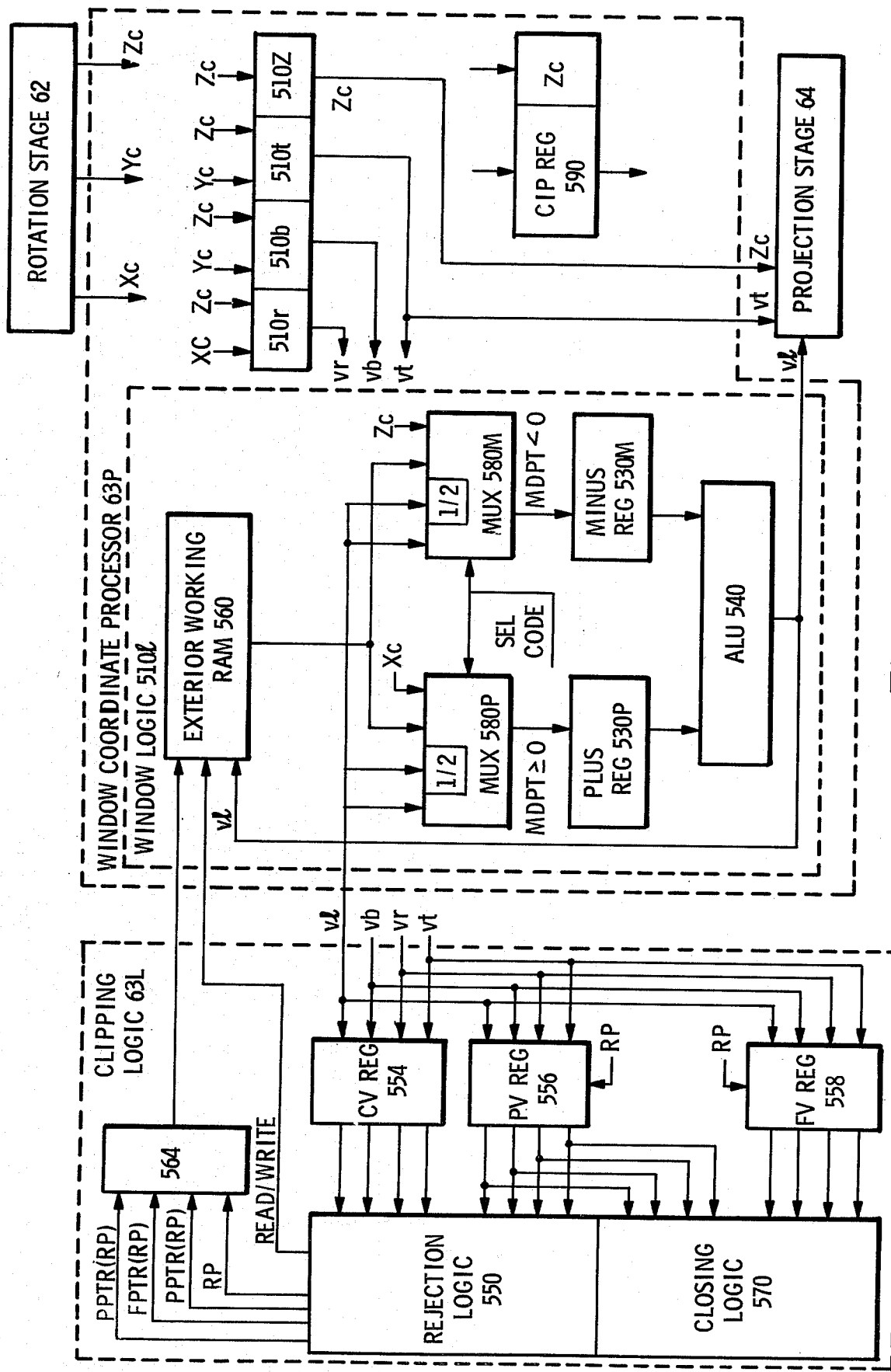
FIG. 5 is a block diagram of clipping stage 63 which eliminates image data outside the field of vision.

FIG. 5 shows window coordinate processor or generator 63G and clipping logic 63L which cooperate to eliminate points outside the viewing volume or pyramid of vision 250 shown in FIG. 2a. Pyramid of vision 250 has its vertex at the eye of the pilot (origin 220). The viewing volume in the embodiment shown is bounded by four planes defined by the four sides of the aircraft window. Non-square windows may be emloyed and would require a correspondingly different viewing volume configuration.

Clipping is accomplished at the object face level. Each face is defined by a CCW sequence of vertices. Pairs of adjacent vertices defining each face edge are processed in sequence through clipping stage 63 to determine whether the face is:

Case A—face completely within view,
Case B—face partially within view, or
Case C—face completely out of view.

Faces which are only partially in view (Case B) are intercepted by the boundary planes of the pyramid of vision 250. In the process of clipping, Case B faces are modified by the addition of new vertices which define new edge coinciding with the intersection of the boundary planes. The result is a modified closed polygon face that is completely within pyramid 250.

The position of any point or vertex relative to pyramid of vision 250 is defined by the orthogonal distance across window plane 260 of that vertex from each of the four boundary planes of pyramid of vision 250. Referring to FIG. 2a, point 254 forming the top of the flag pole 256 is positionally defined by the four window coordinates vl, vr, vb, vt in Zc plane 260. These window coordinates are calculated as follows:

$$vl = Kl\, Z + X \text{ (distance to the left plane)}$$

$$vr = Kr\, Z - X \text{ (distance to the right plane)}$$

$$vb = Kb\, Z + Y \text{ (distance to the bottom plane)}$$

$$vt = Kt\, Z - Y \text{ (distance to the top plane)}$$

where the K's are constants associated with the vertex angles of pyramid 250. For a square pyramid of vision having equal vertex angles A, $Kl = Kr = Kb = Kt = \text{Tan}(A/2)$. A point is inside the truncated pyramid of vision 250 if $vl \geq 0$, $vr \geq 0$, $vb \geq 0$, $vt \geq 0$, and $Zc \geq 0$, that is, if all of the window coordinates have zero or positive values.

The above window coordinates are calculated from Vc by window logic 510-l, 510-r, 510-b, 510-t, and 510-z shown in FIG. 5 (only 510-l is shown in detail). Window circuit 510-l receives Xc and Zc from rotation stage 62 for temporary storage in interior working registers 530. ALU unit 540 performs the required addition or subtraction.

Clipping logic 63L determines which vertices are visible for each face, and determines when to compute the interception vertices where face edges intercept a boundary plane. Visibility is determined within rejection logic 550 by systematically advancing and comparing the sign of the window coordinates of each vertex with the sign of the corresponding window coordinates of the immediately previous vertex. The window coordinates of visible vertices are advanced to projection stage 64. All vertex coordinates must be saved in RAM 560 for calculation of possible intersection vertices and for closing. Rejection logic 550 provides separate PTRs for each plane saved.

The signs of the window coordinates for each vertex are combined in a single five-bit out-code (OC):

$$OC = \text{sign l, sign r, sign b, sign t (and sign Z)}$$

and are entered into current vertex (CV) register 554. The sign of each window coordinate is "0" for positive and "1" for negative. The origin of each window coordinate is the corresponding boundary of image window 262 with the negative direction extending away from image window 262 (see FIG. 2b, left for vl, right for vr, down for vb, and up for vt). The positive direction for each window coordinate is toward the center of image window 262. The four boundaries of pyramid 250 subdivide the Zc plus half-space in front of aircraft 14 into nine regions. The out-code of each Vc identifies the region in which the point or vertex is located. The out-code for each region of the two-dimensional projection of pyramid 250 is shown in the following table:

| upper left region 1001 (0) | upper region 0001 (0) | upper right region 0101 (0) |
|---|---|---|
| left region 1000 (0) | visible region window 262 0000 (0) | right region 0100 (0) |
| lower left region 1010 (0) | lower region 0010 (0) | lower right region 0110 (0) |

The relative position of any face edge to pyramid 250 can be found by comparing the out-codes of the end points of the edge. The starting point O.C. is always in previous vertex (PV) register 556, and the terminal point O.C. is always in CV register 554.

Three sub-possibilities exist for the relative position of each face edge with respect to pyramid 250:

Case 1: Both vertices of the face edge are in view. No clipping is necessary:

)C(P)=0000(0) and OC(C)=0000(0).

Case 2: One vertex of the face edge is within view and the other is outside. The face edge intersects the pyramid 250:

OC(P)=0000(0) and OC(C)≠0000(0), or

OC(P)≠0000(0) and OC(C)=0000(0).

Case 3: Both vertices are outside pyramid of vision 250:

OC(P)≠0000(0) and OC(C)≠0000(0).

In Case 3, definite decisions can be made only if the vertices points of the edge are either both to the right or both to the left, i.e., sign l(P)=sign l(C)=1 (negative) or sign r(P)=sign r(C)=1 (negative). Furthermore, if OC(P)=OC(C)≠0000, both ends are outside, in the same region. In all these cases the face edge can be rejected. The rejection criteria of rejection logic 550 can be expressed as a Boolean function (R) of the two out-codes. If R=0, none of the above rejection criteria are satisfied, and a part of the face edge boundary may go through image window 260.

Whenever Case 2 is determined by rejection logic 550, the intersection of each face edge and pyramid of vision 250 is then calculated by window logic 510 using a binary search technique. The algorithm for the search is as follows:

(A) Let the window coordinates of the vertex inside image window 260 be Vin and the outside coordinates be Vout (one is CV and the other is DV).
(B) The midpoint between Vin and Vout is calculated by ALU 540.
(C) If the midpoint is within pyramid 250, Vin is replaced by the midpoint.
(D) If the midpoint is outside, Vout is replaced by the midpoint.
(E) The process continues by returning each new midpoint to ALU 540 through multiplexers 580 until the distance of the midpoint from one side of pyramid 250 is less than the termination tolerance.
(F) The last midpoint and Vin become the vertices (CV and PV) of the clipped edge just formed.

There remains the problem of modifying the edges of the clipped faces. In some situations the intersections of the face edges and the boundary planes of the pyramid of vision 250 define the new face edge. In other situations one or more corners of the window must be inserted into the sequence of vertices to complete the closed polygon face.

The out-code of the window coordinates for the first vertex of each face is stored in first vertex (FV) register 558 for comparison with the last vertex processed by window coordinate processor 63G. Closing logic 570 makes this comparison to complete the face.

DETAILED DESCRIPTION

Registers 530 P and M may be holding registers (74S194's) connected in cascade (with carry over) preferably with left and right shifting for facilitating midpoint computation.

ALU540 may be an arithmatic logic unit (841gl's) for adding, subtracting or passing data as required.

UV register 554 may be a 4 bit holding register (74174).

PV register 556 and PV register 558 may be 4 bit holding registers (74174's), one for each clipping plane, for storing 3 bits of pointer (2 bits for RP plus 1 bit for FVF) and 1 bit of O.C.

RAM 560 may be a 16 bit by 4 word random access memory (74S189's) for storing FV and PV window coordinates.

MUX 580 P and M may be 4:1 multiplexers (74153's) for selecting: (1) Xc and Zc during window coordinate calculation; (2) ALU output; (3) ALU output divided by 2 (right shift), and (4) RAM 560 for reading back the window coordinates of previous vertices during clipping testing.

MUX 564 may be a 4:1 multiplexer (74153's) for selecting RAM addresses RP, PPTR(RP), FPTR(RP) and PPTR(CP).

PROJECTION STAGE 64

General

Figure 6:
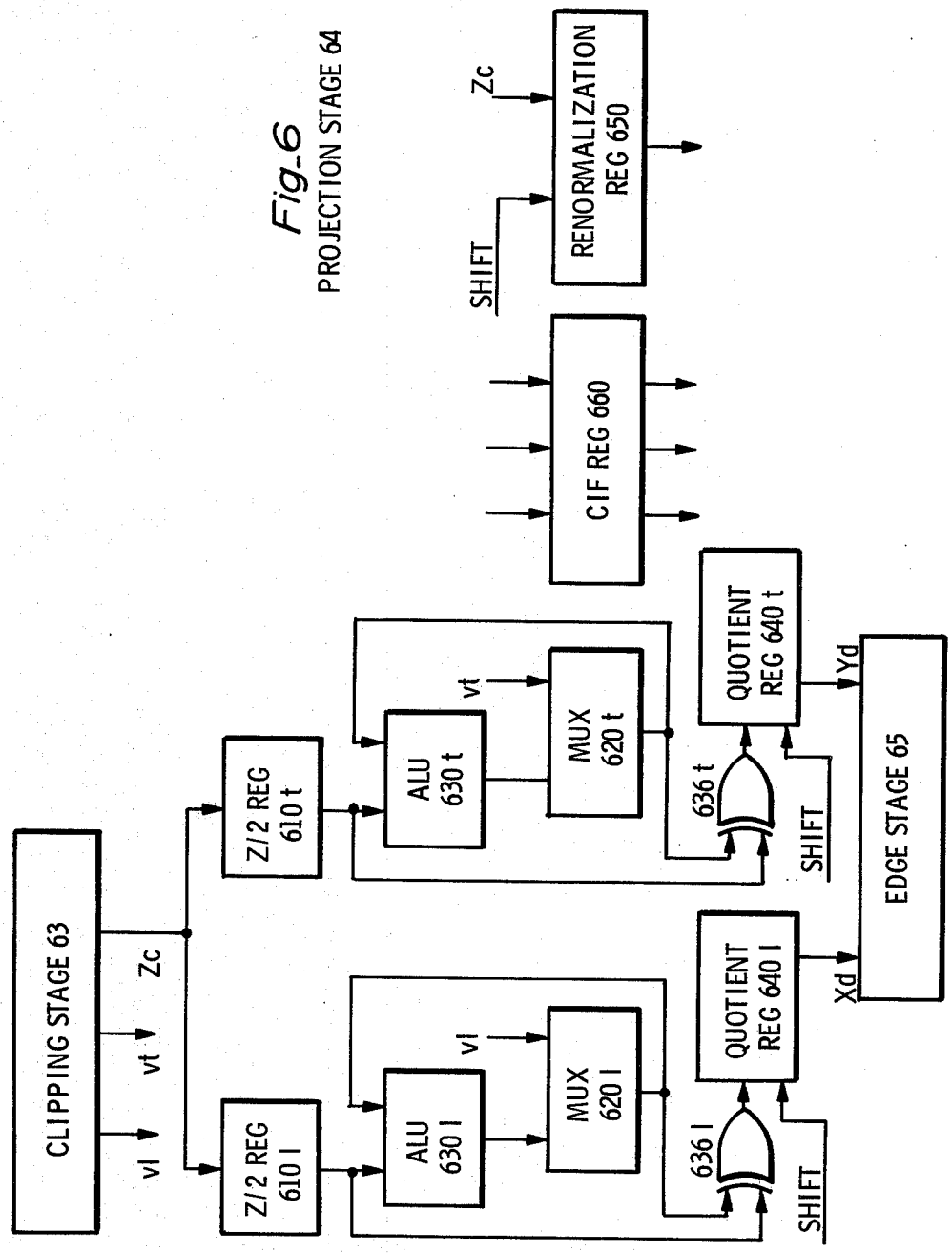
FIG. 6 is a block diagram of projection stage 64 wherein Xc and Yc are divided by Zc to project Vc into the display plane.

FIG. 6 shows projection and clipping stage 64 of image processor 42 which projects three-dimensional window coordinates vl, vt, and Vz from clipping stage 63 into a two-dimensional vector Vd (Xd, Yd). The projected vectors Vd define the end points of each face edge for face generation stage 65. The projection is accomplished by dividing vl and vt by Zc through a binary division nonrestoring technique (described in "Digital Arithmetic-I" by Y. Chu pages 39–43). Z/2 registers 610-1 and 610-t load the divisor Zc/2, and MUX/Register 620-1 and 620-t select and load the dividend vl/2 and vt/2 in response to control logic 70. The inputs to registers 610 and 620 are right-shifted by one digit to establish the division by two. Arithmetic logic unit ALU 630-1 and 630-t then receive the dividends through shift return loops 623-1 and 623-t, or subtract Zc/2 thereto in response to a ± function from logic 70. The dividend ±Zc/2 term is loaded into MUX's 620, returned to ALU's 630, and then combined with another ±Z/2. The output of ALU's is slew wired with respect to the input to MUX's 620 causing a division by two right shift. The vl/Vz and vt/Vz quotients are generated one bit at a time, MSB first, by comparing the sign bit (MSB) of Zc with the sign bit of the partial remainders with MUX 620 through sign gates 636-l and 636-t. The quotient bits individually enter quotient registers 640-l and 640-t, and are left-shifted by control logic 70. Zc on line 592 from range register 590 is loaded into renormalization register 650 and right-shifted by control logic 708 the same number of places as were left-shifted in normalizer 370 in translation stage 60. Color, intensity, and flat data on line 592 from CIF register 590 is loaded into CIF register 660 in response to control logic 70.

DETAILED DESCRIPTION z12 register 610 may be a 24 bit register (four 74S174's).

MUX/Registers 620 may be 24 bit 2:1 multiplexers (five 74S298's) with storage.

ALU's 630 may be 16 bit flowthrough arithmetic logic units (four 74S181's + one 74S182).

Sign gates 636 may be exclusive OR gates (74S86).

Quotient registers 640 may be 12 bit shift registers (three 74164's) for receiving the projected data Xd and Yd one bit at a time as it is generated by ALU's 630.

Zc register 650 may be a 24 bit shift register (six 74S195's).

CIF register 660 may be a series of 74S174's.

EDGE STAGE 65

General

FIG. 7 shows edge stage 65 having Xd processor 706X and Yd processor 706Y which receive projected face vertex coordinates (Xd and Yd) from projection stage 64 and provides face edge lists to display generator 44. Each edge is defined by edge data including a starting point (Xds, Yds), the Y coordinate of the termination point (Ydt), plus the slope of the edge (delta X/delta Y).

The Y coordinates of each set of face vertices (Xd and Yd) are loaded into current Y mux-register 710 and advanced to previous Y register 716 in CCW order as defined in data base 48. Each current Y coordinate (Ydc) and previous Y coordinate (Ydp) are forwarded to adder 720 for calculating a delta Y for each face edge or pair of points (delta Y = Ydc − Ydp). Simultaneously, each Ydc and Ydp are entered into Y start multiplexer 730s and Y terminate multiplexer 730t. The starting Y coordinate Yds is the end point of each face edge that is scanned first on CRT 82; and the terminate Y coordinate Ydt is scanned last. In the embodiment shown, the conventional top to bottom scan is employed. Therefore, the start point Yds is always the smaller of the two adjacent points Ydc and Ydp. The sign bit of delta Y (SIGN ΔY) defines which is smaller, Ydc or Ydp, as follows:

| for + delta Y | for − delta Y |
|---|---|
| Ydc = Ydt, and Xdc = Xdt | Ydc = Yds, and Xdc = Xds |
| Ydp = Yds, and Xdp = Xds | Xdp = Xdt, and Xdp = Xdt | and activates multiplexers 730s and 730t accordingly. Slope divider 740 provides the slope of each edge face by computing delta X/delta Y for the corresponding pair of vertices.

The face edges are arranged in scan order by Yds sorter 750 according to the smallest YDs. Each edge data set is loaded into sorter 750 in CCW order and forwarded to image generator 44 in order of smallest Yds for accomodating the top to bottom scan.

DETAILED DESCRIPTION

Xd processor 706X has the same hardware as Yd processor 706Y, and is therefore now shown in detail.

Current Y mux-register 710 may be a 12 bit 2:1 muliplexer-register (three 74298's) for the current vertex of each face as the vertices are received in CCW order from quotient registers 640-l and 640-t.

Previous Y register 716 may be a 12 bit storage register (two 74174's) for holding the vertex just preceding the current vertex.

First vertex Y register 718 may be a 12 bit storage register (two 74174's) for holding the first vertex while the intermediate vertices are processed. The first vertex is loaded into current mux-register 710 as the last vertex is advanced to previous vertex status to form the last edge of the face.

Adder 720 may be a 12 bit adder (three 74283's) for calculating delta Y = Ydc − Ydp, and forwarding SIGN Y to Y and X multiplexers-registers 730s and 730t.

Inverter 722 may be a 12 bit inverting buffer (two 74S04's) for inverting Ydp into −Ydp. The carry in on adder 720 is forced to 1 to complete the complement of Ydp.

Start point and terminate point multiplexer-register 730 may be 12 bit 2:1 multiplexer-registers (three 74298's each) for simultaneously holding both Ydc and Ydp available for selection as either Yds or Ydt.

Delta Y register 724 may be a 12 bit storage register (three 74S175's) for holding delta Yc while divider 740 forms the slope (delta Xp/delta Yp) for the previous edge. Additionally register 724 may include a zero detect circuit (one 74S30) for providing deltaY=0 to control 70 when the slope is horizontal and the edge may be omitted from further processing.

Divider 740 may be a 12 input bit-20 output bit binary division nonrestoring divider as described in projection stage 64, for calculating slope = delta X/delta Y. The dividend delta X may be right shifted into additional shift register (one 74166) for scaling down the resulting slope to accomodate a Y increment of one raster line. In the embodiment shown the right shift is nine places to accomodate a 1024 scan line, interlaced display (2 to the 9th = 512).

Sorter 750 may be a 12 bit key-96 bit non key sorter for output edge data in order ascending of Yds, formed by:

(a) a 16 word 12 bit key data RAM (three 74S189's) for receiving and storing the key data (Yds) in input order.

(b) a 16 word 5 bit pointer RAM (two 74S189's) for storing the RAM pointers.

(c) A three level pointer pushdown stock (two mux-registers 74298's—first level, one 74S174—second level, and one 74S174—third level) for manipulating pointers into sorted order each time a new key is received by the key data RAM.

(d) address counter (one 74161) and smallest key pointer register (one 74S174) for generating RAM addresses and storing the current smallest key RAM address.
(e) RAM address multiplexer (two 74S153's) and a pointer RAM input multiplexer (three 74S153's) which cooperates with the three level stack and address counter for selecting RAM addresses and the pointer RAM input.
(f) an existing key register (three 74S175's) and comparator (three 74S85's) for determining where to insert the input key among the existing key in the key data RAM. The existing key register also stores key data to be advanced to image generator 44.
(g) non key data output register (twenty-four 74S175's) for storing non key data (Xds, slope, Ydt, Zc, and CIF) to be advanced to image generator 44.

CONTROL LOGIC

Processor control logic 70 responds to instruction code and data flags contained in the data flow from data base 48 for processing the coordinate data through image processor 42. The flow tables described below disclose the logic involved in controlling each stage of image processor 42. Various hardware circuit configurations could incorporate this logic.

TRANSLATION STAGE 60--CONTROL LOGIC FLOW TABLE

I. TRANSFER INSTRUCTION WORD: CONTROLLER 46 TO REGISTER 310
  STEP IA:
   (1) Maintain LOAD signal on instruction register 310.
   (2) Load next instruction from buffer register 306 into instruction register 310 (LOAD).
  DECISION IA: Is image data available to translation stage 60 on data bus 307? (DAV)
   YES--STEP IB    NO--STEP IA
  STEP IB:
   (1) Clear accumulator 370 (CLR).
   (2) Clear scaler data "S" from scale register in scaler 360.
   (3) Clear address counter 320A (CLR).
   (4) Set DAR from control logic 70, wait for DAV from interface controller 46.
  DECISION IB: Decode four MSB of instruction in register 310A to identify one of sixteen instructions (0-15).

II. LOAD X INSTRUCTION--LDX (0)
  STEP IIA:
   (1) Load address counter 320A with four bits of address "A" (LOAD).
   (2) Unit decrement word counter 320B (DEC).
  DECISION IIA: DAV?
   YES--DECISION IIB    NO--DECISION IIA
  DECISION IIB: What is R?

| R=1 (fine 16 bit) | R=2 (coarse 16 bit) | R=3 (normal 24 bit) |
|---|---|---|
| 1. Load 16 LSB from bus 307 into RAM 350X. | 1. Same as DECISION IIB (R=1) 1 through 3 except load 16 MSB at 1. | 1. Load 16 LSB from bus 307 into RAM 350X. |
| 2. Load zeros into RAMs 350 Y and Z. | . | 2. Request DAR, wait for DAV. |
| 3.a. Unit increment address counter 320A (INC). | . | 3. Load 8 MSB from bus 307 into RAM 350X. |
| 3.b. Unit decrement word counter 320B (DEC). | . | 4. Load zeros into RAMs 350 Y and Z. |
| 3.c. Set DAR, wait for DAV. | . | 5. Same as DECISION IIB (R=1)3. |
| 4. DECISION IIC. | 2. DECISION IIC. | 6. DECISION IIC. |

DECISION IIC: Is word count in register 320 B=0?
   YES--STEP IA    NO--DECISION IIA III. LOAD Y INSTRUCTION--LDY (1)
  STEP IIIA: Same as STEP IIA.
  DECISION IIIA: DAV?
   YES--DECISION IIIB    NO--DECISION IIIA -continued

| TRANSLATION STAGE 60--CONTROL LOGIC FLOW TABLE | | | | |
|---|---|---|---|---|
| | DECISION IIIB: | What is R? | | |
| | | R=1 | R=2 | R=3 |
| | | 1. Load 16 LSB from bus 307 into RAM 350Y. | 1. Same as DECISION IIIB (R=1)1 through 3 except load 16 MSB at 1. | 1. Load 16 LSB from bus 307 into RAM 350Y. |
| | | 2. Load zeros into RAMs 350 X and Z. | | 2. Set DAR, wait for DAV. |
| | | 3. Same as DECISION IIB (R=1)3. | | 3. Load 8 MSB from bus 307 into RAM 350X. |
| | | | | 4. Load zeros into RAMs 350 X and Z. |
| | | | | 5. Same as DECISION IIB (R=1)3. |
| | | 4. DECISION IIIC. | 2. DECISION IIIC. | 6. DECISION IIIC. |
| | DECISION IIIC: | Is word count in register 320 B=0? | | |
| | | YES--STEP IA  NO--DECISION IIIA | | |
| IV. | LOAD Z INSTRUCTION--LDZ (2) | | | |
| | STEP IVA: | Same as STEP IIA. | | |
| | DECISION IVA: | DAV? | | |
| | | YES--DECISION IIB  NO--DECISION IVA | | |
| | DECISION IVB: | What is R? | | |
| | | R=1 | R=2 | R=3 |
| | | 1. Load 16 LSB from bus 307 into RAM 350Z. | 1. Same as DECISION IVB (R=1) 1 through 3, except load 16 MSB at 1. | 1. Load 16 LSB from bus 307 into RAM 350Z. |
| | | 2. Load zeros into RAMs 350 X and Y. | | 2. Set DAR, wait for DAV. |
| | | 3. Same as DECISION II CISION II (R=1) 3. | | 3. Load 8 MSB from bus 307 into RAM 350Z. |
| | | | | 4. Load zeros into RAMs 350 X and Y. |
| | | | | 5. Same as DECISION IIB (R=1)3. |
| | | 4. DECISION IVC. | 2. DECISION IVC. | 6. DECISION IVC. |
| | DECISION IVC: | Is word count in register 320 B=0? | | |
| | | YES--STEP IA  NO--DECISION IVA | | |
| V. | LOAD XY INSTRUCTION--LXY (3) | | | |
| | STEP VA: | Same as STEP IIA. | | |
| | DECISION VA: | DAV? | | |
| | | YES--DECISION VB  NO--DECISION VA | | |
| | DECISION VB: | What is R? | | |
| | | R=1 | R=2 | R=3 |
| | | 1. Load 16 LSB from bus 307 into RAM 350X. | 1. Same as DECISION VB (R=1) 1 through 5, except load 16 MSB at 1 and 3. | 1. Load 16 LSB from bus 307 into RAM 350X. |
| | | 2. Set DAR, wait for DAV. | | 2. Set DAR, wait for DAV. |
| | | 3. Load 16 LSB from bus 307 into RAM 350Y. | | 3. Load 8 MSB from bus 307 into RAM 350X. |
| | | 4. Load zeros into RAM 350Z. | | 4. Set DAR, wait for DAV. |

TRANSLATION STAGE 60--CONTROL LOGIC FLOW TABLE
-continued

|     |     |                      |              |                   |
| --- | --- | -------------------- | ------------ | ----------------- |
|     |     | 5. Same as DE-       | .            | 5. Load 16 LSB    |
|     |     | CISION IIB           | .            | from bus 307      |
|     |     | (R=1)3.              | .            | into RAM 350Y.    |
|     |     |                      | .            | 6. Set DAR,       |
|     |     |                      | .            | wait for DAV.     |
|     |     |                      | .            | 7. Load 8 MSB     |
|     |     |                      | .            | from bus 307      |
|     |     |                      | .            | into RAM 350Y.    |
|     |     |                      | .            | 8. Load zeros     |
|     |     |                      | .            | into RAM 350Z.    |
|     |     |                      | .            | 9. Same as DE-    |
|     |     |                      | .            | CISION IIB        |
|     |     |                      | .            | (R=1)3.           |
|     |     | 6. DECISION          | 2. DECISION  | 10. DECISION      |
|     |     | VC.                  | VC.          | VC.               |

DECISION VC: Is word count in register 320 B=0?
YES--STEP IA   NO--DECISION VA

VI. LOAD A INSTRUCTION--LDA (4)
STEP VIA: Same as STEP IIA.
DECISION VIA: DAV?
YES--DECISION VIB   NO--DECISION VIA
DECISION VIB: What is R?

| R=1 | R=2 | R=3 |
| --- | --- | --- |
| 1. Load 16 LSB from bus 307 into RAM 350X. | 1. Same as DE- CISION VIB (R=1) 1 through 6, ex- cept load 16 MSB at 1, 3, and 5. | 1. Load 16 LSB from bus 307 into RAM 350X. |
| 2. Set DAR, wait for DAV. | | 2. Set DAR, wait for DAV. |
| 3. Load 16 LSB from bus 307 | | 3. Load 8 MSB from bus 307 |
| into RAM 350Y. | . | into RAM 350X. |
| 4. Set DAR, | . | 4. Set DAR, |
| wait for DAV. | . | wait for DAV. |
| 5. Load 16 LSB | . | 5. Load 16 LSB |
| from bus 307 | . | from bus 307 |
| into RAM 350Z. | . | into RAM 350Y. |
| 6. Same as DE- | . | 6. Set DAR, |
| CISION IIB | . | wait for DAV. |
| (R=1) 3. | . | 7. Load 8 MSB |
| | . | from bus 307 |
| | . | into RAM 350Y. |
| | . | 8. Set DAR, |
| | . | wait for DAV. |
| | . | 9. Load 16 LSB |
| | . | from bus 307 |
| | . | into RAM 350Z. |
| | . | 10. Set DAR, |
| | . | wait for DAV. |
| | . | 11. Load 8 MSB |

TRANSLATION STAGE 60--CONTROL LOGIC FLOW TABLE -continued

|  |  |  |  | from bus 307 |
|---|---|---|---|---|
|  |  |  |  | into RAM 350Z. |
|  |  |  |  | 12. Same as DECISION IIB |
|  |  |  |  | (R=1) 3. |
|  |  | 7. DECISION VIC. | 2. DECISION VIC. | 13. DECISION VIC. |
|  | DECISION VIC: | Is word count in register 320 B=0? YES--STEP IA   NO--VIA |  |  |
| VII. | RECALL X--RCX (5) |  |  |  |
|  | STEP VIIA: | Clear address counter 320A (CLR). |  |  |
|  | DECISION VIIA: | DAV? |  |  |
|  |  | YES--DECISION VIIB   NO--DECISION VIIA |  |  |
|  | DECISION VIIB: | What is R? |  |  |
|  |  | R=2 (16 bit) | R=3 (24 bit) |  |
|  |  | 1. Load 16 MSB from bus 307 into RAM 350X. | 1. Load 16 LSB from bus 307 into RAM 350X. |  |
|  |  | 2. Set DAR, wait for DAV. | 2. Set DAR, wait for DAV. |  |
|  |  |  | 3. Load 8 MSB from bus 307 into RAM 350X. |  |
|  |  |  | 4. Set DAR, wait for DAV. |  |
|  |  | 3. STEP XIIA. | 5. STEP XIIA. |  |
| VIII. | RECALL Y--RCY (6) |  |  |  |
|  | STEP VIIIA: | Clear address counter 320A (CLR). |  |  |
|  | DECISION VIIIA: | DAV? |  |  |
|  |  | YES--DECISION VIIIB   NO--DECISION VIIIA |  |  |
|  | DECISION VIIIB: | What is R? |  |  |
|  |  | R=2 (16 bit) | R=3 (24 bit) |  |
|  |  | 1. Load 16 MSB from bus 307 into RAM 350Y. | 1. Load 16 LSB from bus 307 into RAM 350Y. |  |
|  |  | 2. Set DAR, wait for DAV. | 2. Set DAR, wait for DAV. |  |
|  |  |  | 3. Load 8 MSB from bus 307 into RAM 350Y. |  |
|  |  |  | 4. Set DAR, wait for DAV. |  |
|  |  | 3. STEP XIIA. | 5. STEP XIIA. |  |
| IX. | RECALL Z--RCZ (7) |  |  |  |
|  | STEP IXA: | Clear address counter 320A (CLR). |  |  |
|  | DECISION IXA: | DAV? |  |  |
|  |  | YES--DECISION IXB   NO--DECISION IXA |  |  |
|  | DECISION IXB: | What is R? |  |  |
|  |  | R=2 (16 bit) | R=3 (24 bit) |  |
|  |  | 1. Load 16 MSB from bus 307 into RAM 350Z. | 1. Load 16 LSB from bus 307 into RAM 350Z. |  |
|  |  | 2. Set DAR, wait for DAV. | 2. Set DAR, wait for DAV. |  |
|  |  |  | 3. Load 8 MSB from bus 307 into RAM 350Z. |  |
|  |  |  | 4. Set DAR, wait for DAV. |  |
|  |  | 3. STEP XIIA. | 5. STEP XIIA. |  |
| X. | RECALL XY--RXY (8) |  |  |  |
|  | STEP XA: | Clear address counter 320A (CLR). |  |  |
|  | DECISION XA: | DAV? |  |  |
|  |  | YES--DECISION XB   NO--DECISION XA |  |  |
|  | DECISION XB: | What is R? |  |  |
|  |  | R=2 (16 bit) | R=3 (24 bit) |  |
|  |  | 1. Load 16 MSB from bus 307 into RAM 350X. | 1. Load 16 LSB from bus 307 into RAM 350X. |  |
|  |  | 2. Set DAR, wait for DAV. | 2. Set DAR, wait for DAV. |  |
|  |  | 3. Load 16 MSB from | 3. Load 8 MSB from bus |  |

TRANSLATION STAGE 60--CONTROL LOGIC FLOW TABLE -continued

|  |  |  | bus 307 into RAM 350Y<br>4. Set DAR, wait for<br>DAV. | 307 into RAM 350X.<br>4. Set DAR, wait for<br>DAV. |
|---|---|---|---|---|
|  |  |  |  | 5. Load 16 LSB from bus |
|  |  |  |  | 307 into RAM 350Y. |
|  |  |  |  | 6. Set DAR, wait for |
|  |  |  |  | DAV. |
|  |  |  |  | 7. Load 8 MSB from bus |
|  |  |  |  | 307 into RAM 350Y. |
|  |  |  |  | 8. Set DAR, wait for |
|  |  |  |  | DAV. |
|  |  |  | 5. STEP XIIA. | 9. STEP XIIA. |
| XI. | RECALL A--RCA (9) | | | |
|  | STEP XIA: | Clear address counter 320A (CLR). | | |
|  | DECISION XIA: | DAV? | | |
|  |  | YES--DECISION XIB | NO--DECISION XIA | |
|  | DECISION XIB: | What is R? | | |
|  |  | R=2 (16 bit) | R=3 (24 bit) | |
|  |  | 1. Load 16 MSB from bus 307 into RAM 350X. | 1. Load 16 LSB from bus 307 into RAM 350X. | |
|  |  | 2. Set DAR, wait for DAV. | 2. Set DAR, wait for DAV. | |
|  |  | 3. Load 16 MSB from bus 307 into RAM 350Y. | 3. Load 8 MSB from bus 307 into RAM 350X. | |
|  |  | 4. Set DAR, wait for DAV. | 4. Set DAR, wait for DAV. | |
|  |  | 5. Load 16 MSB from bus 307 into RAM 350Z. | 5. Load 16 LSB from bus 307 into RAM 350Y. | |
|  |  | 6. Set DAR, wait for DAV. | 6. Set DAR, wait for DAV. | |
|  |  |  | 7. Load 8 MSB from bus 307 into RAM 350Y. | |
|  |  |  | 8. Set DAR, wait for | |
|  |  |  | DAV. | |
|  |  |  | 9. Load 16 LSB from bus | |
|  |  |  | 307 into RAM 350Z. | |
|  |  |  | 10. Set DAR, wait for | |
|  |  |  | DAV. | |
|  |  |  | 11. Load 8 MSB from bus | |
|  |  |  | 307 into RAM 350Z. | |
|  |  |  | 12. Set DAR, wait for | |
|  |  |  | DAV. | |
|  |  | 7. STEP XIIA. | 13. STEP XIIA. | |
| XII. | RECALL LOAD--RCL (10) | | | |
|  | STEP XIIA: | (1) Load accumulator 370 (X, Y, and Z) with "Vo" from RAM 350 (X, Y, and Z) at address A=0. | | |
|  |  | (2) Unit increment address counter 320A (INC). | | |
|  |  | (3) Load accumulator 370 (X, Y, and Z) with "-Vp" from RAM 350 (X, Y, and Z) at address A=1 to form Vt=Vo-Vp. | | |
|  |  | (4) Unit decrement word counter 320B (DEC). | | |
|  | DECISION XIIA: | Is the face part of a three dimensional object (is 3D flag set)? | | |
|  |  | YES--STEP XIIB | NO--STEP XIIE | |
|  |  | (Three dimensional case) | (Two dimensional case) | |
|  | STEP XIIB: | (1) Wait for DAV. | | |
|  |  | (2) Load Three D register 341 (LOAD). | | |
|  |  | (3) Set DAR, wait for DAV. | | |
|  |  | (4) DECISION XIIB. | | |
|  | DECISION XIIB: | Is word count ≧ 4? Vertex pointers are packed four to one sixteen bit word. | | |

TRANSLATION STAGE 60—CONTROL LOGIC FLOW TABLE -continued

|  |  | YES--STEP XIIC | NO--STEP XIID |
|---|---|---|---|
| | STEP XIIC: | (1) | Wait for DAV. |
| | | (2) | Load Three D register 342. |
| | | (3) | Set DAR, wait for DAV. |
| | | (4) | STEP XIID. |
| | STEP XIID: | (1) | Load address counter 320A with first vertex pointer "A" from register 310A. |
| | | (2) | Load scaler 360 with "S" from register 310B. |
| | | (3) | Load accumulator 370 with the Δ V data from RAM 350 as accessed by the pointer from the Three D buffers. |
| | | (4) | Clear address counter 320A. |
| | | (5) | Wait for DAR-T from Normalizer 380. |
| | | (6) | Enable FIRST VERTEX flag in CIF register. |
| | | (7) | Load the buffer register in accumulator 370 with the contents of the accumulator (LOAD-B). |
| | | (8) | Clear "S" register in scaler 360. |
| | | (9) | Clear accumulator 370. |
| | | (10) | Unit decrement word counter 320B. |
| | | (11) | Load H and N address register 386 with "A" (LOAD). |
| | | (12) | Load accumulator 370 with Vo. |
| | | (13) | Unit increment address counter 320A. |
| | | (14) | Load accumulator 370. |
| | | (15) | Load address counter 320A with vertex address from Three D register 341 or 342. |
| | | (16) | Load scale register within scaler 360. |
| | | (17) | Load accumulator 370. |
| | | (18) | Clear address counter 320A. |
| | | (19) | Wait for DAR-T. |
| | | (20) | Repeat items 7, 8, 9, and 10 of STEP XIID |
| | | (21) | Same as STEP XIID items 12–19. |
| | | (22) | Same as STEP XIID items 7–10. |
| | | (23) | Load last vertex flag into CIF registers when B=0. |
| | | (24) | DECISION XIID. |
| | DECISION XIID: | Is word count B=0? | |
| | | YES--STEP IA | NO--DECISION XIIE (Visibility Test) |
| | STEP XIIE: | (1) | Same as STEP XIID items 1 and 2. |
| | | (2) | Wait for DAR-T. |
| | | (3) | Same as STEP XIID item 7. |
| | | (4) | Set first vertex flag. |
| | | (5) | Load accumulator 370. |
| | | (6) | Increment address counter 320A. |
| | | (7) | Decrement word counter 320B. |
| | | (8) | DECISION XIIC. |
| | DECISION XIIC: | Is word count B=0? | |
| | | YES--STEP IA | NO--STEP XIIF |
| | STEP XIIF: | (1) | Wait for DAR-T. |
| | | (2) | Same as STEP XIIE items 4–7 except set last vertex flag when B=0. |
| | | (3) | DECISION XIIC. |
| | DECISION XIIE: | Is product of Visibility Test positive or negative? | |
| | | POSITIVE--STEP IA | NEGATIVE--STEP XIIG |
| | STEP XIIG: | (1) | Same as STEP XIID items 20–23. |
| | | (2) | DECISION XIIF |
| | DECISION XIIF: | Is word count B=0? | |
| | | YES--STEP IA | NO--STEP XIIG |

XII. COLOR INTENSITY FLAG--CIF (11)

In this instruction the CIF registers are loaded with CIF data from bus 307. Word counter 320B is decremented after each load until B=0.

XIV. STRING INSTRUCTION--STG (12)

In this instruction the initial face of a string of faces is processed from RAM 350 through translation stage 60 into rotation stage 62 as a string of light points or four sided faces. The vertices of the four sided faces are retrieved from RAM 350 in CCW order as described in "XI. RECALL A--RCA (9)," beginning on page XIII-II.

XV. LOAD H--LDH (13) AND LOAD N--LDN (14)

In this instruction data is loaded into H/N address register 3 from data bus 307, and then into H/N RAM 410 as described in Section VI. H/N Ram 410 receives the data during an idle portion of its cycle.

ROTATION STAGE 62

FIG. 8A shows the logic-diagram for the processing of translated point coordinates (Vt) from translation stage 62. Each new Vt is loaded into multiplexers 416X, Y, and Z (Step I). The object code in CIF register 460 which accompanies each new Vt is examined to determine if the new Vt is associated with a 3 D face requiring visibility testing (Decision A). If so, the dot product of Vt·Vn (from N RAMs 410X, Y, and Z) is calculated (Step II). The sign bit of the dot product reveals whether the 3 D face is visible or not (Decision B). The vertex of visible 3 D faces (Decision B—yes) and the remaining non-3 D face vertices (Decision A—no) are multiplied by the three×three H matrix in H RAMs 410X, Y, and Z to provide the rotated vector Vc - Zc first, Yc second, and Xc last (Step III). Each coordinate is loaded into registers 450X, Y, and Z as they are calculated (Decision C and D, Steps IV, V, and VI).

CLIPPING STAGE 63

FIG. 8B shows the flow chart for the control of clipping stage 63. The output of rotation stage 62 is continuously monitored for the arrival of the vertex (Decision A). Each new vertex Vc=(Xc,Yc,Zc) is entered as required into window logic 510 (l, b, r, t, and Z) where the window coordinate vl, vb, vr and vt are generated for each new vertex (Step 1).

The basic clipping test (Step 2) is accomplished by rejection logic 550 within clipping logic 63L. Step 2 is repeated until all vertices have been determined as visible or outside pyramid of vision 250, and all intersection vertices (IV) have been calculated. The clipping test (shown in more detail in FIG. 8C) has five possible outcomes:

1. (01)—CV is visible and PV is outside requiring the calculation of an intersection vertex (IV) —CV must be saved for processing after IV;
2. (10)—CV is outside and PV is visible requiring the calculation of an intersection vertex (IV);
3. (incompletely processed vertex)—saved vertex from outcome 1 are retrieved and processed;
4. (close)—the first vertex (FV) stored in RAM 560 becomes CV; and
5. (next vertex)—return to Decision A.

Visible CV's cannot be forwarded to projection stage 64 until the preceding IV (if any) has been calculated and forwarded. The proper order of vertex sequence must be maintained in order to accommodate the hardware and program in the subsequent stages. The CV's with preceeding IV's are saved as incompleted branches and are processed after the preceeding IV has been determined and processed.

In step 3 (or 4) the window coordinate within plus register 530P (or minus register 530M) is written into RAM 560 at PTR(RP), and CP register in plane enable 1240 is updated with the current RP. During step 5, the intersection vertex (IV) for outcome 1(01) or outcome 2(10) is calculated within logic 510 employing a midpoint or binary technique in which the vector extending between CB and PV is continuously divided into two equal parts (see Section X).

During step 6, the vertex that was saved in outcome 1 is retrieved. The plane number is read from IPV stack 1248 and loaded into plane enable 1240. IPV stack 1248 pops up one place. The saved vertex is read from RAM560 at PPTR(CP) for retesting via Step 2.

After all the vertices of the current face have been processed, last vertex (LVF=1) initiates the closing procedure for the current face. FV O.C. from FV register 558 is compared tp PV O?C. from PV register 556, and the first closing rejection plane RP is determined (step 7). The outcode (O.C.) is checked (Decision D) and the outcome is processed by steps 8, 9, or 10. In Step 8, register 530M is updated from RAM560 at PPTR(CP). In Step 9, register 530P is updated. In Step 10 FVP is initialized for the next face (FVF=1) and LVF is cleared (LVF=0). The current face processing completed, and the processor returns to Decision A - wait for the first vertex of the next face. During Step 11, a CP register within CP enable 1240 is updated with RP register 1244. The bits of PV register 556 and FV register 558 for the planes enabled by load control 1250 are updated with RO and FV O.C..

FIG. 8C shows the flow chart for the basic clipping test (Steo 2 of FIG. 8B). During Steps 2-1 the first rejection plane RP is determined for CV or PV by rejection logic 550. The first vertex flag FVF is examined (Decision 2-A). If FVF is set, the PV O.C. word should be all "0" (a dummy value for facilitating testing. If a PV exists (FVF=0) then the outcode of CV is compared with the outcode of PV (Decision 2-B). Four possibilities exist for the pair of O.C. bits at plane RP: "01" and "10" (Case 2), "11" (Case 3) and "00" (Case 1). During Step 2-2 or Step 2-3) the contents of register 530 M (or 530 P) is written into RAM 560 at PPTR(RP). During Step 2-2 push down stack 1248 is pushed down one place to account for the incompletely processed vertex created by the intersection vertex between CV and PV. CP is loaded into the stack. Each Case 1 vertex (00) is advanced to projection stage 64 has a visible vertex. Both Case 1 vertices (00) and Case 3 vertices (11) must be retained in RAM 560 (Step 2-4) until all incompletely processed vertices have been processed.

If CV is the first vertex )FVF=1), the O.C. of CV is examined for "1" (Decision 2-C). The first "1"s detected (if any) determines RP. If there are no "1"s, then the vertex is visible and RP is set to the value of the last plane. Visible Vertices are advanced to projection stage 64. During Step 2-5 the contents of register 530 P is written into RAM 560 at PTR(RP=Pn) where Pn is the number of planes forming the pyramid of vision—which is the embodiment disclosed is four. The skipping, or combining, of redundant tests is provided in Step 2-5 for the group of adjacent planes for which CV is visible (if any) and the first plane for which CV is not visible. PV register 556 and FV register 558 within the planes enabled by register load control 1250, are updated with RP and CV O.C. bits. Incompletely processed vertex (IPV) stack 1248 is monitored (Decision 2-D). When all of the vertices have been processed, the last vertex flag (LVF) is tested. For LVF=1, all the vertices of the current face have been tested and the face is ready for closing the vertices between PV and FV (if any) are then tested for intersections. LFV=0 indicates that the current vertex is not the last vertex.

EDGE STAGE 65

FIG. 8D shows the logic diagram for the control of projection stage 64, processor 706X and Y, and slope divider 740. The clipped points from clipping stage 63 are loaded into registers 610 for projection division (Step 1). The quotients (projected points) are forwarded from registers 640 to edge stage 65, where it is examined for face data (Decision A). Non face data such as points and line segments are forwarded immediately to FIFO memory 910. Each face data point is examined for a first vertex (Decision B), which are loaded in V1 register 718 and current Yd multiplier register 710 (Step 2). Each non first vertex is loaded into register 710 as the current Yd and the previous Yd is advanced to register 716 (Step 3). Xd is similarly processed through processor 706X. Delta X and delta Y are calculated from their current and previous values, and loaded into registers 724 (Step 4). When the last vertex becomes the previous vertex in register 716 (Decision C), the face is closed by advancing V1 from register 718 to register 710 as the current vertex (Step 5). The last slope is calculated from the previous vertex (Vlast) and the current vertex (V1) and entered into register 724. The slopes are calculated by slope divider 740 as the delta X's and delta Y's are provided (Step 6).

TEXTURE STAGE 72

FIG. 8E shows the logic diagram for the control of Yds sorter 750. Input face edges are loaded into sorter 750 and examined for horizontal edges—delta Y=0 (Decision D). Horizontal edges are forwarded to FIFO memory 910 (Step 7). The non horizontal edges are examined for a first edge (Decision E). The first edge is entered at the start of the sort list (Step 8). Non first edges are examined to determine whether the input Yds is less than the last or output Yds in sorter 750 (Decision F). Smaller input Yds are entered at the start of the sort list (Step 9). Larger Yds are examined for a last edge (Decision G). Last edge is entered in last place of sort list (Step 10). The second edge is loaded (Step 11) and examined for input Yds less than the last Yds in sorter 750 (Decision H). Smaller Yds are inserted in the sort list (Step 12). Larger Yds are examined for last edge (Decision I). Last edges are entered into the sort list (Step 13). If the input edge is not the last edge, the next edge is loaded (Step 14). The input edge is again examined for a last edge (Decision J)—return to Decision D of flow chart for non last edge, and output sorter 750 to FIFO memory 910 for last edge.

DISPLAY GENERATOR 44

Texture Stage 72

Texture Stage 72, shown in FIG. 9, provides miniraster data for the set of horizontal scan lines forming each face. The miniscan lines progressively increase and/or decrease in response to the face edge list (Xds, Yds, Xslope, and Ydt for each edge) from face generation stage 65. The miniraster data for each miniscan line includes the Xd coordinate of the left hand end point (XdL), the width of the miniscan line (W), the Yd coordinate (Yd scan), Zc and CIF.

The edge list is loaded into memory 910 in ascending Yd order by face order once each frame, and extracted in the same order twice each frame—once for the field of even miniscan lines, and once for the field of odd miniscan lines. X coordinate generators 920L and 920R provide XdLc and XdRc respectively for each miniscan line by combining Xds with the Xslopes of the two opposed edges of the face which contain the end points of the scan line. XdLs is incremented by the left hand slope (XL slope) to form each XdL, and XdRs is incremented by the right hand slope (XR slope) to form each XdR. Only generator 920 is shown in detail. Slope multiplexer 928 divides the XL slope by two (select START) for the first scan line of the even field, to accomodate the one half scan height displacement between the interlaced odd and even fields on display 82. During the remainder of the display cycle, the XL slope is passed through slope multiplexer 928 without division (select ACC) to accomodate the proper height spacing between adjacent miniscan lines in the same field. Adder 930 combines the X coordinate of the previous scan line (XdLp) with the current XL slope to provide the current X coordinate (XdLc). Output multiplexer register 940 provides either XdLs (select START) or XdLc (select ACC) to miniraster data register 950. Subtractor 952 provides the width W of each scan line by subtracting XdLc from XdRc (output of generator 920R). The Y coordinate of the miniscan lines (Yd scan) is similarly formed by incrementing Yds with Yslope from Yslope generator 960. At the end of each edge, Yd scan equals or exceeds the Ydt on the left edge (YdLt) or right edge (YdRt). The signals Yd scan$\geq$YdLt and Yd scan$\geq$YdRt indicate to control logic 70 that the next XL slope or XR slope is required in Xd generators 920.

DETAILED DESCRIPTION

FIFO memory 210 may be a 2048 words$\times$100 bits memory (two hundred 82S11's) for sequentially outputting the complete edge list twice each cycle. Memory 210 interfaces with the remainder of miniraster calculator 72 through a 100 bit register (twenty five 74S175's).

XL slope register 924 may be a 20 bit storage register (five 74S175's) for holding each new Xslope as they are provided by memory 910.

XL slope multiplexer 928 may be a 20 bit 2:1 multiplexer (five 74S157's) with the START input right shifted to provide a division by two. The START and ACC select are provided by control logic 70.

XL Adder 930 may be a 20 bit adder (five 74283's) for incrementing each previous X left coordinate (XdLp) by the current XL slope.

Limit multiplexer 934 may be a 20 bit 4:1 multiplexer (ten 74S153's) for preventing underflow and overflow when an edge approaches the display boundary. The four inputs are XdLc (twice), all ones (overflow), and all zeros (underflow). The two select inputs are the sign bits of XdLc and XL slope. Underflow occurs when both sign XdLc and sign XL slope are negative. Overflow occurs when sign XdLc is negative and sign XL slope is positive.

XdLs register 938 may be a 12 bit register (three 74S175's) for holding the X coordinate of the starting end point of the current edge (Xds) as it is provided by FIFO memory 910.

Output multiplexer register 940 may be a 20 bit 2:1 multiplexer register (five 25S09's) for accumulating XdLc and outputting either XdLs or XdLc. The output is returned to adder 930 and forwarded to miniraster data register 950.

Miniraster data register 950 may be a 76 bit register (nineteen 74S175's) for holding the miniraster data (XdLc 12 bits, W 12 bits, Yd scan 12 bits, CIF 24 bits, and Z 16 bits.

Subtractor 952 may be a 12 bit subtractor (three 74283's and two 74S04's) for providing the width of each miniscan line (W=XdRc−XdLc) to register 950.

Yslope generator 960 may be a 12 bit register (three 74S175's) hardwired to specify the maximum number of miniraster scan lines per frame. This number defines the scan density or Yslope.

Yslope multiplexer 964 may be a 12 bit multiplexer (two 74S157's) similar in function to Xslope multiplexer 928.

Y Adder 968 may be a 12 bit adder (three 74283's) for combining the 12 bits of Yslope with the 12 bits of Y coordinate of the previous scan line (Ydp) to form the Y coordinate of the current scan line (Yd scan).

Multiplexer register 970 may be a 12 bit multiplexer register (three 25S09's) similar in function to output multiplexer register 940.

Ydt register 974 may be a pair of 12 bit registers (six 74S175's) for holding the Yd coordinates of the left hand edge termination point (YdLt) and the right hand edge termination point (YdRt) which are periodically forwarded by FIFO memory 910.

Comparator 978 may be a pair of 12 bit comparators (six 74S85's) for comparing Yd scan with YdLt and YdRt to determine the end of each edge.

DEFLECTION CONTROL 74

Deflection stage 74 receives Yd scan accompanied by a series of XdLc's and W's for generating the sweep voltages which provide the series of horizontal scan lines outlining each polygon face. Yd scan identifies vertical position of the first vertex. XdL identifies the left hand start of each scan line thereafter. W determines the length of each scan line. Conventional integrator techniques may be employed to provide the appropriate X and Y ramp deflection voltages. The Y ramp changes at a uniform rate starting at Yd scan to move the CRT beam vertically across the face being displayed. The X ramps change at a much faster rate starting from an XdL to move the beam horizontally a distance indicated by the associated W. Suitable deflection techniques are disclosed in detail in U.S. Pat. No. 3,999,308 entitled "Real-Time Simulation of a Point System Having Textured Areas as Viewed by a Moving Observer" issued on Dec. 28, 1976 to Robert Louis Peters.

VIDEO CONTROL 76

Video control 76 receives color and intensity data from CIF 660 in projection stage 64 for each face being displayed to control the color and display brightness of the scan lines forming that face. If desired, the display intensity may be attenuated by Zc data for range simulation. Suitable video control techniques are also disclosed in detail in U.S. Pat. No. 3,999,308.

FULL RASTER EMBODIMENT

If desired, the edge list from register 760 may be displayed on a full raster in the conventional frame manner across the entire screen of display device 82. The vertices of all visible polygon faces (or visible portions thereof) for each frame are sorted by Yds to arrange the vertices in display order by raster. Next, the contents of each scan line are sorted by Xds to arrange the vertices in display order by raster. Next, the contents of each scanline are sorted by Xds to arrange the vertices in order of display within each scanline. The resulting Yds—Xds sorted edge list with accompanying slope and Yds data is processed through a conventional full raster display generator which provides the necessary vertical and horizontal sweep voltage waveforms.

CLIPPING LOGIC 63L

An examination of the outcodes (O.C.'s) for the vertices of each face reveal which vertices are within pyramid of vision 250. The comparison of the O.C. bits for the current vertex (CV) with the O.C. bits of the previous vertex (PV) for each plane reveals: which edges are entirely inside (Case 1—both O.C.'s positive);

which edges are entirely outside (Case 3—both O.C.'s negative) and;

which edges intersect one of the boundary planes (Case 2—one O.C. positive and one O.C. negative) requiring the generation of an intersection vertex (IV) via the binary search technique employed in window logic circuits 510.

The O.C. examination is illustrated plane by plane in FIGS. 10A–G.

THE CLIPPING TREE

The process of the above examination (boundary plane testing) is conveniently expressed by a clipping logic tree for each face. FIG. 10A shows logic tree 1000 for expressing the clipping process of "V" shaped face 1010 shown in FIG. 10B. Tree 1000 has four input trunks (TRUNK 1-4), one for each vertex. V1-V4 of face 1010 and four nodes (NODES l, b, r, and t) one for each boundary plane. At each node, the window coordinates of a vertex are tested against that boundary plane to determine if that vertex is either outside or possibly inside pyramid of vision 250. Each trunk advances one node to the right towards the output as each boundary plane is tested. If the sign comparison test between a current vertex (CV) and the current boundary plane is negative (outside that boundary plane) the vertex trunk terminates at that node. Only a CV within pyramid of vision 250 will have all positive tests (inside each boundary plane) and advance along its vertex trunk to the output of the logic tree. These vertices are visible, and are processed to projection stage 64 without clipping. Interception branches are formed off a boundary plane node when a CV forms the terminal end of an edge which intersects the current boundary plane under test. That is when the CV has the opposite O.C. sign as its PV.

The logic tree for "shape" face 1010 having four vertices V1–V4 is analyzed below for a four sided pyramid of vision having a left plane (Pl), a bottom plane (Pb), a right plane (Pr) and a top plane (Pt).

Pl Test (see NODE 1 and FIG. 10C):

The sign of the window coordinate v1 for each vertex V1–V4 is examined to determine whether the first bit of the O.C. for that vertex is negative (1) or positive (0). If any vertex has a negative first bit, it is necessarily outside pyramid of vision 250 (to the left of boundary plane Pl), and the trunks for that vertex would be discontinued. All vertices with a positive first bit may possibly be in the field of vision (to the right of Pl) and must be processed further along their trunks to determine visibility. The O.C. status after the Pl test is:

OC for V1=0—on the visible side of Pl
OC for V2=0—on the visible side of Pl
OC for V3=0—on the visible side of Pl
OC for V4=0—on the visible side of Pl This status is indicated in logic tree 1000 by the existance of a plus sign in node −1 on each trunk of each input vertex. The first vertex V1 is repeated after the last vertex V4 to permit comparing their O.C. The edge extending there between V4–V1 is required to close the polygon face.

Pb test (see NODE-b and FIG. 10D):

The sign of the next window coordinate vb of each vertex is tested against bottom boundary plane Pb to determine the next bit of the O.C.

| | | |
|---|---|---|
| OC for V1 = 01 | TRUNK 1 discontinued | |
| | BRANCH (V1-V2) | |
| OC for V2 = 00 | on the visible side of Pb | |
| | BRANCH (V2-V3) | |
| OC for V3 = 01 | TRUNK 2 discontinued | |
| | BRANCH (V3-V4) | |
| OC for V4 = 00 | on the visible side of Pb | |
| | BRANCH (VH-V1) | |
| OC for V1 = 01 | TRUNK 1 discontinued | |

V1 forms part of the first edge V1–V2 and the closing edge V4–V1 and is listed twice above and appears twice under Nove-b to assist in visualizing branching and intersection vertices (IV) which are generated whenever an edge intersects a boundary plane. Branches are provided from each main trunk corresponding to the IV's. The branches extend between the trunks of the adjacent vertices which form the intersecting edge. An IV exists on a boundary between adjacent vertices if the OC bits for that boundary have different signs. FIG. 10D reveals that vertices V1 and V3 are definitely outside pyramid of vision 250 generating four IV's along boundary plane Pb-IVb(1-2), IVb(2-3), IVb(3-4), and IVb(4-1).

Pr Test (see NODE r and FIG. 10E):

The sign of the window coordinate vr for the two vertices and four IV's is examined to determine the next bit of the OC. IV's along right boundary plane Pr corresponding to changes in sign of the previous vb OC bits must also be tested.

| | | |
|---|---|---|
| IVb (102) --- | 1...discontinued | |
| | Branch IVb (1–2) - V2 | |
| OC for V2 | 000- on the visible side of Pr | |
| | Branch V2 - IVb (2–3) | |
| IVb (2–3) -- | 1...discontinued | |
| | Branch IVb (2–3) - IVb (3–4) | |
| IVB (3–4) --- | 0- on the visible side of Pr | |
| OC for V4 | 000- on the visible side of Pr | |
| IVb (4–1) --0- | | |
| | Branch IVb (4–1) - IVb(1–2). | |
| IVb (1–2) --1- | on the visible side of Pr | |

FIG. 10E reveals that IVb (1-2) and IVb (2-3) are outside the pyramid of vision generating four new interception vertices IVr (1-2), IVr (2-3), IVr (2-4) and IVr (4-2). In this case IVb, an intersection vertex, is the first vertex and is repeated for closing.

Pt Test (see NODE t and FIG. 10F):

The last bit of the OC for each vertex is determined by testing the two continued vertices and the four continued IV's with top boundary plane Pt.

| | | |
|---|---|---|
| | IVr (1-2) ---0 | visible |
| OC for V2 0000 | | visible |
| | IVr (2-3) ---0 | visible |
| | IVr (2-4) ---0 | visible |
| | IVb (3-4) ---0 | visible |
| OC for V4 0000 | | visible |
| | IVb (4-1) --00 | visible |
| | IVr (4-2) --00 | visible |

IVr (1-2) is not repeated because its O.C. is the same as IVr(4-2), and therefore no intersection results from closing.

This test completes the clipping process yielding the above eight output points within pyramid of vision 250 forming the two triangular faces shown in FIG. 10G.

PLANE TESTING—GENERAL CASE

The algorithm for clipping a polygon against a single plane tests the vettices of the polygon in sequence. Each vertex, in turn, becomes the current vertex CV and then the previous vertex PV. The terminal vertex V of each edge is CV, and the start vertex of each edge is PV. The out code (O.C.) of the current vertex is stored in CV register 554, and compared to the corresponding O.C. of the immediately previous vertex which has been stored in PV register 556 from the test of the previous plane.

The four possible relationships between the edges of square face 1106 and a boundary plane is illustrated in FIG. 11A–D. In FIG. 11A–D, node 1110 represents the test against left boundary plane Pl, input line 1120 from the left represents the terminal vertex CV to the test, the arrows extending to the right of node 1110 represent the possible results of the Pl test. The result of each test depends on CV O.C. and PV O.C. in registers 554 and 556.

FIG. 11A shows face edge 1140A starting at V1 (PV) and terminating at V2 (CV). Both V1 and V2 are on the positive side of Pl (the same side as pyramid of vision 250). Both PV O.C. and CV O.C. are positive and the testing of V2 is advanced to the next node as indicated by arrow 1150.

FIG. 11B shows face edge 1140B starting at vertex V2 (PV) and terminating at vertex V3 (CV). Edge 1140B intersects Pl at intersection vertex (IV) 1160 causing a change in the signs of left window coordinate v1. PV O.C. is positive and CV O.C. is negative. IV 1160 is advanced to the next node as indicated by branch 1164. V3 is not advanced to the next node because v1 for V3 is negative—V3 is outside pyramid of vision 250.

FIG. 11C shows face edge 1140C starting at V3 (PV) and terminating at V4 (CV). Edge 1140C does not intersect Pl and a branch is not generated. Note that v1 for V4 is negative and therefore V4 is not advanced to the next node.

FIG. 11D shows face edge 1140D starting at V4 (PV) and terminating at V1 (CV), and intersecting Pl at IV 1170. IV 1170 is advanced to the next node as indicated by branch 1174. V1 is positive and is advanced to the next node as indicated by arrow 1176.

CLIPPING LOGIC—CIRCUIT OPERATION

Figure 12:
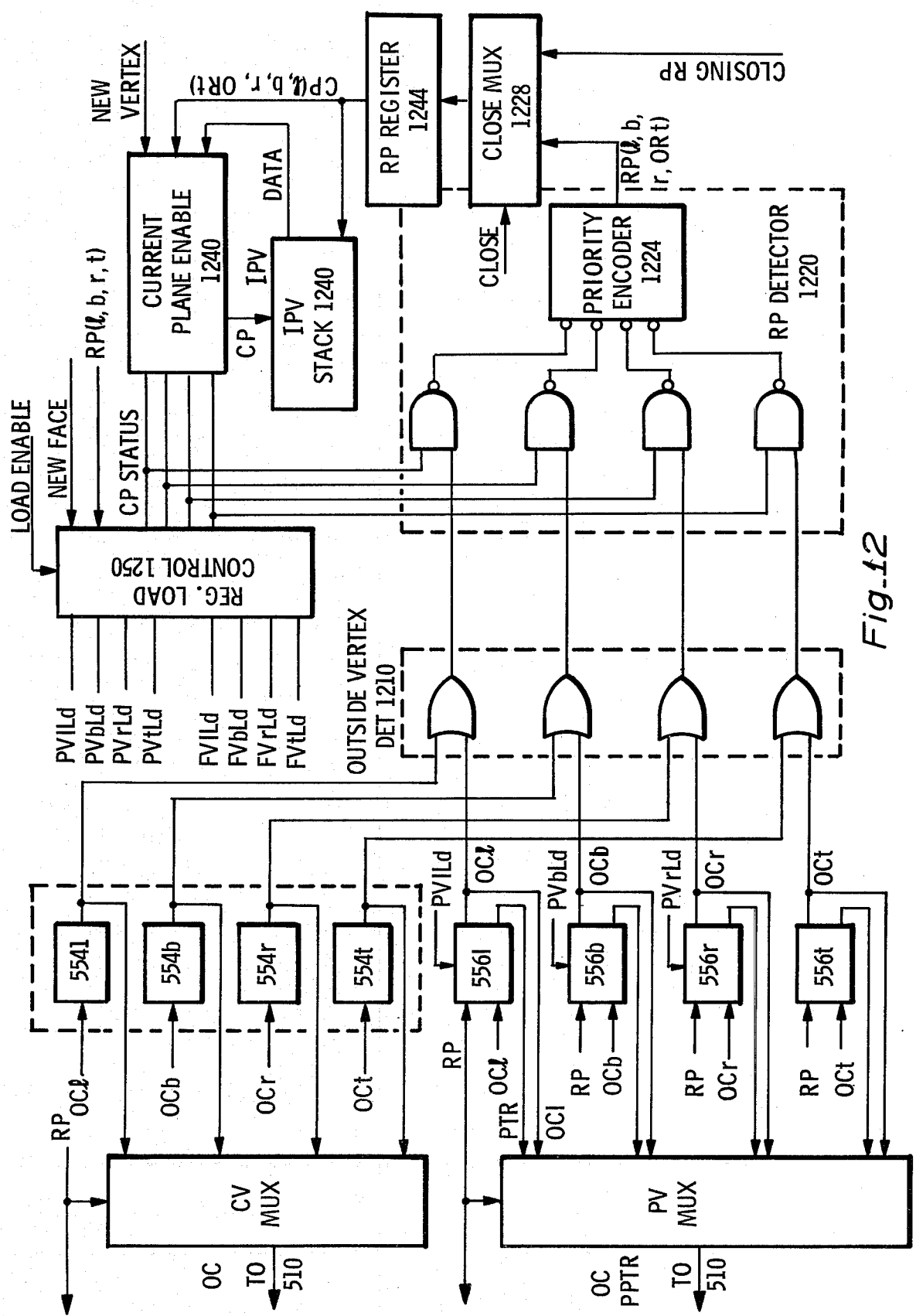
FIG. 12 is a block diagram of rejection logic 550 showing a plane testing circuitry.

FIG. 12 is a block diagram of rejection logic 550. The outcodes (O.C.) enter outside detector 1210 from CV register 554 and PV register 556. Outside vertex detector 1210 examines the O.C. for both end points CV and PV of the current edge for "1"s to determine if either the start point (PV) or the terminal point (CV) (Case II) or both (Case III) are outside window 262. Rejection plane detector 1220 is responsive to the determination of outside vertices for identifying the first plane of rejection RP (l, b, r, or t) for the circuit vertice CV. RP is loaded into register 1244.

At the end of each test, RP (l,b,r, or t) is loaded into current plane enable circuit 1240 to become the current plane CP. Outout CP STATUS is advanced and rejection plane controller identifies the next plane of rejection. After the CV has either been determined visible (passed all four plane tests) or not visible (rejected by at least one plane) and all the generated intersection vertices have been tested; another vertex must be supplied to continue the logic tree testing. The vertices are processed in CCW order through the image processor 42 (and through rejection logic 550). Each new vertex is loaded into current vertex (CV) register 554 and PV register 556 is updated with RP from RP register 1244 and CV.O.C. bits from CV register 554 within the planes enabled by control 1250. As each new vertex is introduced, NEW VERTEX enables all planes for testing (CP STATUS=1111, the 2's compliment of −1). The planes are then disabled in the order l, b, r, and t as the testing for each plane is completed.

Register load control 1250 is responsive to CP STATUS for individually updating the appropriate section (l, b, r, or t) of PV register 556 as the logic tree is executed. The current O.C. bit is entered along with RP (l, b, r, or t) for addressing the corresponding window coordinate in RAM 560.

Case II situations require the calculation of intersection vertices (IV) by binary search technique within window logic 510 based on the window coordinates of CV and PV.

A CP register within CP enable 1240 stores the plane number of the current plane CP, which in the embodiment illustrated is a number between 0 and 3. IPV stack 1248 increments by one each time the CV processing is interrupted due to the generation of an intersection vertex, and decrements by one each time an incompletely processed vertex is retrieved for processing.

DETAILED DESCRIPTION

Outside detector 1210 is a "1" detector formed by a series of OR gates (7432—one for each boundary plane or window edge of window 262) for detecting Case II and Case III situations where at least one vertex of an edge is outside window 262 and requires clipping.

Rejection plane detector 1220 is formed by a series of NAND gates (7400 one for each boundary plane of window 262) for combining the "1"s from outside detector 1210 with CP STATUS from current plane enable circuit 1240. The output of the NAND gates defines the order in which the boundary planes are to be tested. Encoder 1224 is a four-to-two priority encoder (74148) for reducing the four outputs of the NAND gates to two bits.

Current plane enable circuit 1240 has three parts:

A. A three bit 3:1 multiplexer (74153) for selecting between the two bits of RP (plus one bit of hardwired "0"), three bits of hardwired "1"s in response to NEW VERTEX from control logic 70, and two bits of incompleted branch data (IB DATA) from incomplete branch stack 1248.

B. A three bit register (74175) for storing the multiplexer selection.

C. A four bit x five word lookup table (PROM MMI6331), for generating CP STATUS as follows:

| SELECTION | CP STATUS | | | | PLANES ENABLED | | | |
|---|---|---|---|---|---|---|---|---|
| NEW VERTEX | 1 1 1 1 | 1 1 1 1 | | | l, b, r, t | | | |
| RP=Pl | 0 0 0 1 | 1 1 0 | | | b, r, t | | | |
| RB=Pb | 0 0 1 1 | 1 0 0 | | | r, t | | | |
| RP=Pr | 0 1 0 1 | 0 0 0 | | | t | | | |
| RP=Pt | 0 1 1 0 | 0 0 0 | | | none | | | |
| | t r b 1 | | | | | | | |

RP register 1244 may be a two bit register (74175) for holding the number (0–3) of the current rejection plane RP (l, b, r, or t). RP register may be eliminated for high speed operations, permitting rejection logic 550 to function on a faster assynchronous basis.

IPV stack 1248 may be a three bit random access memory (74S189) addressed by an up-down counter (74S169) for storing each current plane CP from current plane enable 1240 when an incompletely processed vertex develops. The number of entries in the RAM increases (and decreases) as IPVs are identified (and completed). As the logic tree for each face advances and the intersection vertices have been processed, each which was interrupted due to IPVs, becomes RP again and that IPV is completed.

Four RP bits have been provided for in rejection logic 550 for accommodating a quadralateral window 262. Suitable provision may easily be made to accommodate more complete polyhedrons of vision having more boundary planes.

Register load control 1250 is formed by three parts:

A. A 4 bit by 4 word look up table (PROM) for receiving the two bits of RP and providing four line RP status compatible with CP STATUS as shown below:

| RP INPUT | RP STATUS | PLANES ENABLED |
|---|---|---|
| RPl 0 0 | 0 0 0 1 | 1 |
| RPb 0 1 | 0 0 1 1 | 1 b |
| RPr 1 0 | 0 1 1 1 | 1 b r |
| RPt 1 1 | 1 1 1 1 | 1 b r t |
| | t r b 1 | |

B. A series of AND gates (7408 one for each boundary plane) for combining CP STATUS and RP status to generate a load signal for each plane. Registers PV (I) and FV(I) to be enabled must satisfy $CP < I \leq RP$.

C. A pair of four bit 2:1 multiplexers responsive to NEW FACE from control 70 for selecting the above plane load signals from the AND gates or four hardwired initialization "1"S. The first multiplexer provides PVlLd, PVrLd, and PVtLdtp PV register 556. The second multiplexer provides FVlLd, FVbLd, FVrLd, and FVtLd to PV register 558, and is enabled if FVF (RP)=1.

Closing logic 570 (FIG. 5) is formed by a series of exclusive NOR gates (7486—one for each boundary plane followed by a 7404 inverter) for receiving PV O.C. (l,b,r, and t) on one lead and FV O.C. (l,b,r, and t) on th other, followed by a priority encoder which provides CLOSING RP to close multiplexer 1228.

TEST SKIPPING

Figure 13A:
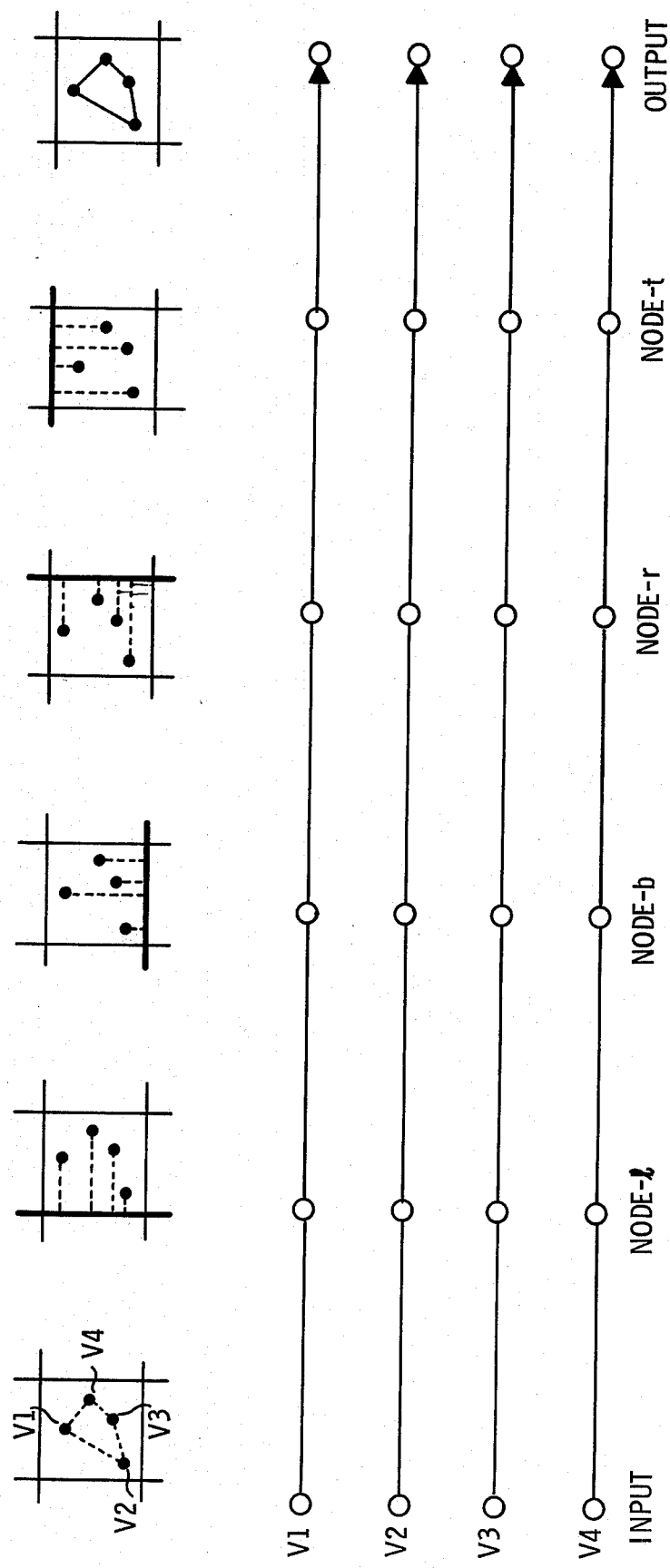

Clipping stage 63 does not test each O.C. bit against the corresponding plane as noted in the prior art. Instead, rejection logic 550 handles the entire O.C. simultaneously and identifies the first plane of rejection (RP) if any, for each vertex. Planes prior to the RP need not be considered further for the current vector CV. A four sided face having all vertices visible (within pyramid of vision 250—Case A) is clipped in four steps, one for each vertex. In a Case A face, each edge has a visible CV and a visible PV (Case I), and all O.C. bits are positive for each edge. The two inputs to each OR gate in outside detector 1210 are "0" for each edge because there are no minus O.C. bits. Rejection plane controller 1220 receives all "0"s and immediately advanced CP STATUS from NEW VERTEX (1111) to RP (0000) and the CV is entered in RAM 560 as a visible point. The CV of each Case I edge advances the entire length of its TRUNK in a single step. No sign changes occur that require calculation and substitution of intersection vertices (IV). The Case A quadralateral is clipped in four easy steps as shown in FIG. 13A. The majority of Case C faces (all vertices outside) may also be clipped in one step per vertex.

The general skipping situation occurs when two or more planes have the same relationship with CV. That is, the O.C. of CV has several "0"s (or "1"s) in a row causing the logic tree for the current face to advance asynchronously to the plane of the last common "0" (or "1") with only a single access to RAM 560.

FIG. 13B shows a collection of Case A and Case C (trivial) faces which can be clipped at the one test per vertex rate (Tn=Vn) as opposed to the Tn=Vn×Pn prior art rate. The remaining Case C faces are more complex and require one step per vertex plus one step per interception vertex:

$$Tn = Vn + IVn.$$

FIG. 13C shows a collection of Case C (complex) faces. Most Case C (complex) faces will require six or eight steps, occasionally more. In the most complicated Case C (complex) closed polygon face, each boundary plane is intersected twice by the closed loop formed by the face edges. Twelve vertices are generated in this worst case situation involving a convex, four sided, polygon (Vn=4, IVn=8). Twelve clipping steps compares favorably with the sixteen step Sutherland approach. The actual number of clipping steps will be less than twelve, however; because at least two intersections along one plane will be clipped away during the testing of the immediately previous plane. The clipping example of FIG. 10B has face 1010 with 12 potential vertices (Vn=4 and IVn=8). However, the two intersections 1066 along the lower portion of Pr were never actually calculated because they were clipped away during Pb testing. The number of clipping steps required in FIG. 12 is only ten. The worst case for four sided concave Case C (complex) faces is four intersections per edge, generating twenty potential vertices (Vn=4 and IVn=16) as shown in FIG. 13D. At least four of these potential intersections are clipped by the previous edge leaving a worst concave case of sixteen clipping steps. The prior art Sutherland technique treats each face as a worst concave Case C (complex) face, and does not take advantage of the test skipping short cuts offered by non worst cases:

1. Less complex concave faces—14 steps or less;
2. Convex faces—10 steps or less;
3. Case C (trivial) faces—4 steps;
4. Case A faces—4 steps.

The majority of faces processed fall into the above nonworst situations.

SHARED MEMORY

Each clipping test of rejection logic 550 requires only one access period for reading and writing into RAM 560 because of the common addressing scheme. The same CV, PV, and FV may be common to all the planes throughout each test. The PV and FV window coordinates (l, b, r, and t) are entered into RAMs 560 (l, b, r, and t) only once at a memory location defined by RP and FVF. As each plane is tested, each CV coordinate (l, b, r, and t) is available from window logic 510 (l, b, r, and t) and each PV (or FV) coordinate is always immediately available from the shared memory location on a single access basis. The shared memory also facilitates skipping planes. All of the vertex coordinates with respect to each plane are available no matter which plane is being tested.

CONCLUSION

The objects of this invention have been accomplished by providing a rejection circuit which simultaneously examines the O.C. of the CV and the PV and asynchronously advances the plane testing procedure skipping redundant tests. The O.C. examination is accomplished by a group of OR gates (l, b, r, and t) in parallel, each of which outputs a "1" if either coordinate thereto is negative (on the other side of the boundary plane from the polyhedral angle of vision). The "1"s are then simultaneously enabled by CP STATUS (a signal defined by the current plane for enabling the remaining planes) by means of a froup of NAND gates (l, b, r, and t) in parallel to identify the next plane of rejection RP. Visible vertices are processed in a single test because NAND gates output all "0"s indicating to the priority encoder that there is no rejection plane. All of the planes are skipped. CP is initiated to 1111, and a new vertex is entered. The identification of a rejection plane for the CV requires the calculation of an IV unless the PV was also rejected. The IV is substituted for the CV creating a new branch in the plane testing procedure. An IPV accounting is maintained by an incompletely processed vertex stack which prevents the entry of the next vertex into the plane testing logic until each of the previously created IPVs are completely processed. The boundary coordinates (l, b, r, and t) for the group of planes being tested are loaded into the same memory location and are accessed through a shared pointer scheme. FV data is stored separately. As a result, when the coordinate data required for processing it is immediately available on a one access time basis.

It will be apparent to those skilled in the art that various changes may be made in the apparatus and techniques described without departing from the scope of the invention. For example, additional boundary planes may be accomodated by a slight increase in hardware.

A distant boundary plane Zd may be employed to clip object data at a distance exceeding the pilot's visibility, Zd. In addition, a new boundary plane Zn may be employed to clip object data too close to the apex of the pyramid of vision to be conveniently displayed. The sequence of testing planes is not limited to a series of adjacent planes, but may be any order. Accordingly, the scope of the invention should be determined only by the wording of the following claims and their legal equivalents.

We claim as our invention:

1. An image processor system responsive to the simulated movement between an observer and the vertices of polygon faces within a data base, which system eliminates polygon vertices outside the polyhedral angle of vision defined by the observers field of view through a polygon shaped viewing port, for providing display signals to a display device, the image processor system comprising:

first circuit means for continuously providing the positional relationship between the observers field of view and the polygon vertices, in sequence defining a current polygon face and a current vertex and a previous vertex within the current polygon face clipping means responsive to the positional relationship for eliminating polygon vertices outside the polyhedral angle of vision as each face becomes the current face by sequentially testing the position of each current vertex simultaneously against the positions of all of the boundary plane surfaces forming the polyhedral angle of vision; and second circuit means responsive to the polygon vertices within the polyhedral angle of vision for providing display signals to the display device.

2. The image processor system of claim 1, wherein the clipping means further includes rejection logic for passing each current vertex within the polyhedral angle of vision and for rejecting each current vertex which is outside the polyhedral angle of vision.

3. The image processor system of claim 2, wherein the rejection logic simultaneously receives all of the coordinates of the relative position of the current vertex with respect to the boundary plane surfaces forming the polyhedral angle of vision and tests the relative position against the boundary plane surfaces in a predetermined sequence.

4. The image processor system of claim 3, wherein the rejection logic tests the boundary planes with adjacent boundary planes of the polyhedral angle having adjacent positions in the testing sequence.

5. The image processor system of claim 3, wherein the rejection logic compares all of the coordinates of the current vertex with all of the coordinates of the previous vertex to determine if the polygon edge extending there between intersects any of the boundary plane surfaces forming the polyhedron of vision.

6. The image processor system of claim 5, wherein the clipping means further includes:

an arithmetic means for determining the point of intersection of the boundary plane surface and the edge extending between the current vertex and the previous vertex; and storage means for retaining the points of intersection for use as intersection vertices which replace the vertices outside the polyhedral angle of vision to form a truncated polygon face entirely within view.

7. The image processor system of claim 6, wherein the arithmetic means determines each intersection vertex by substituting the midpoint of polygon edge extending between the current vertex and the previous vertex for the vertex which is outside the polyhedral angle and calculating the midpoint of the resulting line and substituting the new midpoint for the previous midpoint until a midpoint is calculated having a position on the intersected boundary plane surface, which midpoint is the intersection vertex being determined.

8. The image processor system of claim 6, wherein the rejection means determines whether the current vertex is on the polyhedral angle side of each boundary plane or on the other side of each boundary plane.

9. The image processor system of claim 8, wherein the rejection logic advances the testing of the boundary planes in a predetermined order and skips the test of any boundary plane with respect to which the current vertex is on the same side thereof as the immediately previously tested plane.

10. The image processor system of claim 8, wherein the clipping means further comprises a boundary coordinate generator means for providing a set of coordinates for each polygon vertex defining the positional relationship between that vertex and the boundary planes.

11. The image processor system of claim 10, wherein each set of boundary coordinates defines the distance from that vertex to the boundary planes.

12. The image processor system of claim 11, wherein each boundary plane has an independent bidirectional coordinate system in which the boundary plane is the origin and all boundary coordinates extending away from each plane on the same side therefrom as the polyhedral angle have one sign, and all boundary coordinates extending away from each boundary plane on the other side therefrom have the other sign.

13. The system of claim 12, wherein an outcode word is formed for each vertex by the combining sign of each of the boundary coordinates of that vertex of determining if that vertex is within the polyhedral angle of vision.

14. The system of claim 13, wherein that vertex is within the polyhedral angle of vision if all the signs in the outcode word therefor have one sign, and that vertex is outside the polyhedral angle of vision if all of the signs in the outcode word therefor have the other sign.

15. The system of claim 14, wherein the polyhedral angle of vision is formed by four planes, and the boundary coordinates for each vertex are calculated as follows:

$$vl = KlZ + X$$

$$vr = KrZ - X$$

$$vt = KtZ + Y$$

$$vb = KbZ - Y$$

where:
vl is the distance between the vertex and the planar surface on the left,
vr is the distance between the vertex and the planar surface on the right,
vt is the distance between the vertex and the planar surface on the top,
vb is the distance between the vertex and the planar surface on the bottom,
X, Y, and Z are the coordinates of the observer coordinate system, and
K are constants determined by the apex angle within each plane of polyhedral angle of vision.

16. The system of claim 15, wherein the K of each planar boundary is equal to one half the tangent of the apex angle in that planar boundary.

17. The system of claim 16, wherein the apex angles in opposing boundary planes are equal and Kl=Kr and Kt=Kb.

18. The system of claim 17, wherein all the apex angles are equal and Kl=Kr+Kt=Kb.

* * * * *

UNITED STATES PATENT AND TRADEMARK OFFICE
CERTIFICATE OF CORRECTION

PATENT NO. : 4,208,810

DATED : June 24, 1980

INVENTOR(S) : Michel A. Rohner et al

It is certified that error appears in the above-identified patent and that said Letters Patent are hereby corrected as shown below:

Col. 2, line 17, insert --The subject matter of Sections VI-IX, XI, XII and XIV, and-- before "Figs".

Col. 18, line 33, change PV (second occurrence) to --FV--.

Col. 19, line 16, change "flat" to --flag--.

Col. 19, line 21, change "z12" to --z/2--.

Col. 34, line 21, after "550" insert --(see Section XV, Figure 12)--.

Col. 34, line 58, change "LFV" to --LVF--.

Signed and Sealed this

Thirty-first Day of March 1981

[SEAL]

Attest:

RENE D. TEGTMEYER

Attesting Officer     Acting Commissioner of Patents and Trademarks